US008557013B2

(12) United States Patent
Burnham et al.

(10) Patent No.: US 8,557,013 B2
(45) Date of Patent: Oct. 15, 2013

(54) BIOORGANICALLY-AUGMENTED HIGH VALUE FERTILIZER

(75) Inventors: Jeffrey C. Burnham, Beech Island, SC (US); James P. Carr, Bradenton, FL (US); Gary L. Dahms, Soda Springs, ID (US)

(73) Assignee: VitAG Holdings, LLC, Beech Island, SC (US)

( * ) Notice: Subject to any disclaimer, the term of this patent is extended or adjusted under 35 U.S.C. 154(b) by 139 days.

(21) Appl. No.: 12/981,933

(22) Filed: Dec. 30, 2010

(65) Prior Publication Data
US 2011/0154873 A1  Jun. 30, 2011

Related U.S. Application Data

(60) Provisional application No. 61/291,205, filed on Dec. 30, 2009.

(51) Int. Cl.
*C05F 15/00* (2006.01)
*C05F 9/00* (2006.01)
*C05F 3/00* (2006.01)
*C05F 3/02* (2006.01)
*C05F 7/00* (2006.01)
*C05F 11/00* (2006.01)

(52) U.S. Cl.
USPC ............... 71/11; 71/12; 71/13; 71/14; 71/21; 71/23; 71/27; 71/28; 71/29; 71/30; 71/34; 71/37; 71/40; 71/41; 71/58; 71/61; 71/63; 210/710; 210/749; 210/757; 210/758; 210/759; 210/760

(58) Field of Classification Search
USPC ............... 71/11–63; 210/710, 749, 757–760
See application file for complete search history.

(56) References Cited

U.S. PATENT DOCUMENTS

| 2,026,969 A | 1/1936 | Flynn |
| 2,568,901 A | 9/1951 | Stengel |
| 2,755,176 A | 7/1956 | Pearce |
| 2,800,457 A | 7/1957 | Green |

(Continued)

FOREIGN PATENT DOCUMENTS

| DE | 2523628 | 12/1976 |
| DE | 2800915 | 9/1978 |

(Continued)

OTHER PUBLICATIONS

U.S. Appl. No. 10/854,677, filed Feb. 24, 2005, Burnham.

(Continued)

*Primary Examiner* — Wayne Langel
(74) *Attorney, Agent, or Firm* — Remenick PLLC

(57) ABSTRACT

The invention is directed to processes for treating biosolids that result in high-value, nitrogen-containing, slow-release, organically-augmented inorganic fertilizer that are competitive with less valuable or more costly conventional commercially manufactured fertilizers. The process involves conditioning traditional waste-water biosolids and processing the conditioned biosolids continuously in a high throughput manufacturing facility. The exothermic design and closed loop control of the primary reaction vessel decreases significantly the amount of power necessary to run a manufacturing facility. The process utilizes green technologies to facilitate decreased waste and enhanced air quality standards over traditional processing plants. The fertilizer produced from recovered biosolid waste is safe and meets or exceeds the United States Environment Protection Agency (USEPA) Class A and Exceptional Quality standards and is not subject to restrictions or regulations.

31 Claims, 10 Drawing Sheets

(56) References Cited

U.S. PATENT DOCUMENTS

| | | |
|---|---|---|
| 2,800,458 A | 7/1957 | Green |
| 2,902,342 A | 9/1959 | Keriey |
| 3,050,383 A | 8/1962 | Wilson |
| 3,259,482 A | 7/1966 | Hansen |
| 3,264,088 A | 8/1966 | Hansen |
| 3,264,089 A | 8/1966 | Hansen |
| 3,304,588 A | 2/1967 | Mcilvaine |
| 3,345,288 A | 10/1967 | Sontheimer |
| 3,475,154 A | 10/1969 | Kato |
| 3,476,683 A | 11/1969 | Liljegren |
| 3,655,395 A | 4/1972 | Karnemaat |
| 3,756,784 A | 9/1973 | Pittwood |
| 3,796,669 A | 3/1974 | Matsukawa |
| 3,837,872 A | 9/1974 | Conner |
| 3,915,853 A | 10/1975 | Luck |
| 3,939,280 A | 2/1976 | Karnemaat |
| 3,942,970 A | 3/1976 | O'Donnell |
| 3,960,718 A | 6/1976 | Lebo |
| 3,966,450 A | 6/1976 | O'Neill et al. |
| 4,001,140 A | 1/1977 | Foris et al. |
| 4,076,515 A | 2/1978 | Rickard |
| 4,079,003 A | 3/1978 | Manchak |
| 4,100,103 A | 7/1978 | Foris et al. |
| 4,108,771 A | 8/1978 | Weiss |
| 4,124,405 A | 11/1978 | Quienot |
| 4,134,750 A | 1/1979 | Norton et al. |
| 4,154,593 A | 5/1979 | Brown et al. |
| 4,180,459 A | 12/1979 | Zievers |
| 4,219,347 A | 8/1980 | Young |
| 4,230,568 A | 10/1980 | Chappell |
| 4,249,929 A | 2/1981 | Kneer |
| 4,270,279 A | 6/1981 | Roediger |
| 4,304,588 A | 12/1981 | Moore, Jr. |
| 4,306,978 A | 12/1981 | Wurtz |
| 4,377,406 A | 3/1983 | Achorn et al. |
| 4,377,486 A | 3/1983 | Barrick et al. |
| 4,405,354 A | 9/1983 | Thomas |
| 4,500,428 A | 2/1985 | Lynch et al. |
| 4,514,307 A | 4/1985 | Chestnut et al. |
| 4,519,831 A | 5/1985 | Moore |
| 4,541,986 A | 9/1985 | Schwab et al. |
| 4,554,002 A | 11/1985 | Nicholson |
| 4,601,863 A | 7/1986 | Shioi et al. |
| 4,619,684 A | 10/1986 | Salladay et al. |
| 4,655,932 A | 4/1987 | Roslonski |
| 4,659,472 A | 4/1987 | Nordlund et al. |
| 4,711,659 A | 12/1987 | Moore |
| 4,743,287 A | 5/1988 | Robinson |
| 4,772,490 A | 9/1988 | Kogler et al. |
| 4,781,842 A | 11/1988 | Nicholson |
| 4,792,349 A | 12/1988 | Trimm et al. |
| 4,793,927 A | 12/1988 | Meehan et al. |
| 4,902,431 A | 2/1990 | Nicholson et al. |
| 4,966,706 A | 10/1990 | Gregor |
| 4,997,572 A | 3/1991 | Wurtz |
| 5,013,458 A | 5/1991 | Christy, Sr. et al. |
| 5,051,031 A | 9/1991 | Schumacher et al. |
| 5,087,375 A | 2/1992 | Weinwurm |
| 5,118,337 A | 6/1992 | Bleeker |
| 5,125,951 A | 6/1992 | Lahoda et al. |
| 5,135,664 A | 8/1992 | Burnham |
| 5,147,563 A | 9/1992 | Long, Jr. et al. |
| 5,183,577 A | 2/1993 | Lehmann |
| 5,238,480 A | 8/1993 | Rehberg et al. |
| 5,252,116 A | 10/1993 | Markham et al. |
| 5,259,977 A | 11/1993 | Girovich et al. |
| 5,275,733 A | 1/1994 | Burnham |
| 5,340,376 A | 8/1994 | Cunningham |
| 5,342,442 A | 8/1994 | Nechvatal et al. |
| 5,346,527 A | 9/1994 | Rehbein et al. |
| 5,356,540 A | 10/1994 | Khan et al. |
| 5,385,673 A | 1/1995 | Fergen |
| 5,393,317 A | 2/1995 | Robinson |
| 5,401,402 A | 3/1995 | Christy et al. |
| 5,409,605 A | 4/1995 | Haley et al. |
| 5,417,861 A | 5/1995 | Burnham |
| 5,419,839 A | 5/1995 | Haley et al. |
| 5,422,015 A | 6/1995 | Angell et al. |
| 5,435,923 A | 7/1995 | Girovich |
| 5,443,613 A | 8/1995 | Robinson |
| 5,466,273 A | 11/1995 | Connell |
| 5,500,044 A | 3/1996 | Meade et al. |
| 5,554,279 A | 9/1996 | Christy |
| 5,556,445 A | 9/1996 | Quinn et al. |
| 5,580,458 A | 12/1996 | Yamasaki et al. |
| 5,593,590 A | 1/1997 | Steyskal |
| 5,593,591 A | 1/1997 | Ohsol et al. |
| 5,603,842 A | 2/1997 | Whitaker et al. |
| 5,618,442 A | 4/1997 | Christy |
| 5,635,069 A | 6/1997 | Boss et al. |
| 5,669,969 A | 9/1997 | Meade et al. |
| 5,679,129 A | 10/1997 | Hon |
| 5,681,481 A | 10/1997 | Christy et al. |
| 5,733,355 A | 3/1998 | Hibino et al. |
| 5,766,302 A | 6/1998 | Lefroy et al. |
| 5,783,073 A | 7/1998 | Christy et al. |
| 5,807,724 A | 9/1998 | Resnick |
| 5,849,060 A | 12/1998 | Diping et al. |
| 5,853,450 A | 12/1998 | Burnham et al. |
| 5,853,590 A | 12/1998 | Burnham |
| 5,862,610 A | 1/1999 | Lipert |
| 5,876,613 A | 3/1999 | Bonnin et al. |
| 5,906,750 A | 5/1999 | Haase |
| 5,916,448 A | 6/1999 | Fergen |
| 5,984,992 A | 11/1999 | Greer et al. |
| 5,993,505 A | 11/1999 | Tijsma et al. |
| 6,051,411 A | 4/2000 | Turtakovsky et al. |
| 6,103,191 A | 8/2000 | Luker |
| 6,117,406 A | 9/2000 | Vogel et al. |
| 6,159,263 A | 12/2000 | Greer et al. |
| 6,165,550 A | 12/2000 | Markusch et al. |
| 6,176,891 B1 | 1/2001 | Komoriya et al. |
| 6,187,074 B1 | 2/2001 | von Locquenghien et al. |
| 6,237,246 B1 | 5/2001 | Millard |
| 6,237,264 B1 | 5/2001 | Gulick, Jr. |
| 6,256,902 B1 | 7/2001 | Flaherty et al. |
| 6,284,278 B1 | 9/2001 | Waldman et al. |
| 6,325,035 B1 | 12/2001 | Codina et al. |
| 6,331,300 B1 | 12/2001 | Dybas et al. |
| 6,398,840 B1 | 6/2002 | Orta-Castro et al. |
| 6,406,510 B1 | 6/2002 | Burnham |
| 6,409,788 B1 | 6/2002 | Sower |
| 6,409,789 B1 | 6/2002 | Gilbert |
| 6,461,399 B1 | 10/2002 | Connell |
| 6,465,706 B1 | 10/2002 | Rogers et al. |
| 6,517,599 B2 | 2/2003 | Gilbert |
| RE38,238 E | 8/2003 | Nicholson et al. |
| 6,623,650 B2 | 9/2003 | Millard |
| 6,666,154 B2 | 12/2003 | Logan et al. |
| 6,716,360 B2 | 4/2004 | Titmas |
| 6,752,848 B2 | 6/2004 | Logan et al. |
| 6,752,849 B2 | 6/2004 | Logan et al. |
| 6,758,879 B2 | 7/2004 | Greer et al. |
| 6,841,515 B2 | 1/2005 | Burnham |
| 6,852,142 B2 | 2/2005 | Varshovi |
| 7,128,880 B2 | 10/2006 | Dahms et al. |
| 7,497,956 B2 | 3/2009 | Blais et al. |
| 7,513,927 B2 | 4/2009 | Faulmann et al. |
| 7,604,742 B2 | 10/2009 | Shankar et al. |
| 7,662,205 B2 | 2/2010 | Burnham |
| 7,662,206 B2 | 2/2010 | Burnham |
| 7,713,416 B2 * | 5/2010 | Cabello-Fuentes ........... 210/609 |
| 7,789,931 B2 | 9/2010 | Burnham et al. |
| 7,947,104 B2 | 5/2011 | Burnham et al. |
| 7,947,105 B2 | 5/2011 | Burnham |
| 8,057,569 B2 | 11/2011 | Burnham et al. |
| 8,105,413 B2 | 1/2012 | Burnham |
| 2002/0098982 A1 | 7/2002 | Burnham |
| 2002/0157439 A1 | 10/2002 | Gilbert |
| 2003/0070460 A1 | 4/2003 | Logan et al. |
| 2003/0089151 A1 | 5/2003 | Logan et al. |
| 2003/0121302 A1 | 7/2003 | Oliver et al. |
| 2003/0136165 A1 | 7/2003 | Logan et al. |
| 2004/0065127 A1 | 4/2004 | Connell |

(56) References Cited

U.S. PATENT DOCUMENTS

| | | | |
|---|---|---|---|
| 2004/0177664 A1 | 9/2004 | Hale | |
| 2005/0005660 A1 | 1/2005 | Burnham et al. | |
| 2005/0019207 A1 | 1/2005 | Oliver et al. | |
| 2005/0039508 A1 | 2/2005 | Burnham et al. | |
| 2006/0243009 A1 | 11/2006 | Burnham | |
| 2006/0254331 A1* | 11/2006 | Burnham | 71/11 |
| 2007/0062233 A1 | 3/2007 | Burnham | |
| 2007/0257715 A1 | 11/2007 | Semerdzhiev et al. | |
| 2008/0000279 A1 | 1/2008 | Faulmann et al. | |
| 2008/0034822 A1 | 2/2008 | Burnham et al. | |
| 2008/0120867 A1 | 5/2008 | Perry et al. | |
| 2008/0230484 A1* | 9/2008 | Burnham et al. | 210/710 |
| 2010/0139345 A1 | 6/2010 | Burnham | |
| 2010/0139346 A1 | 6/2010 | Burnham | |
| 2010/0288003 A1 | 11/2010 | Burnham et al. | |

FOREIGN PATENT DOCUMENTS

| | | |
|---|---|---|
| DE | 4127459 | 2/1993 |
| EP | 0770586 | 12/1976 |
| EP | 0143392 | 5/1985 |
| EP | 0143392 | 6/1985 |
| EP | 0356781 | 3/1990 |
| EP | 0557078 | 8/1993 |
| EP | 0770586 | 5/1997 |
| FR | 2133115 | 11/1972 |
| FR | 2757504 | 6/1998 |
| JP | 9110570 | 9/1978 |
| JP | 58032638 | 2/1983 |
| JP | 9110570 | 4/1997 |
| JP | 2001129597 | 5/2001 |
| JP | 2002248454 | 9/2002 |
| WO | WO 8102888 | 10/1981 |
| WO | WO0136082 | 2/1993 |
| WO | WO9856735 | 12/1998 |
| WO | WO9947282 | 9/1999 |
| WO | WO0136082 | 5/2001 |
| WO | WO0136887 | 5/2001 |
| WO | WO0168562 | 9/2001 |
| WO | WO0169150 | 9/2001 |
| WO | WO 03045852 | 6/2003 |
| WO | WO 2004094320 | 11/2004 |

OTHER PUBLICATIONS

AU Exam Report for PCT/US06/036085, dated Jan. 20, 2011.
CA Exam Report for PCT/US06/08536, dated Dec. 9, 2011.
CA Exam Report for PCT/US06/08536, dated Mar. 28, 2011.
RU Examination Report for PCTUS08054315.
AU Exam Report for PCTUS08054315, dated Jul. 5, 2010.
JP Exam Report for PCTUS08054315, dated Dec. 21, 2010.
CN Exam Report for PCTUS08054315.
AU Exam Report for PCTUS08054315, dated Nov. 23, 2010.
CA Exam Report for PCTUS08054315, dated May 10, 2011.
U.S. Appl. No. 13/103,637, filed Nov. 3, 2011, Burnham.
U.S. Appl. No. 13/104,127, filed Nov. 3, 2011, Burnham.
U.S. Appl. No. 12/981,933, filed Jun. 30, 2011, Burnham.
U.S. Appl. No. 13/349,967, Burnham.
U.S. Appl. No. 60/654,957, Burnham.
U.S. Appl. No. 60/659,434, Burnham.
U.S. Appl. No. 60/700,730, Burnham.
U.S. Appl. No. 60/704,458, Burnham.
CA Exam Report for PCT/US2008/54315, dated Feb. 9, 2012.
U.S. Appl. No. 08/520,959, Burnham; Jeffrey C.
U.S. Appl. No. 08/532,273, Burnham; Jeffrey C.
U.S. Appl. No. 11/359,751, filed Feb. 23, 2006, Burnham; Jeffrey C.
U.S. Appl. No. 12/705,794, filed Feb. 15, 2010, Burnham; Jeffrey C.
U.S. Appl. No. 13/103,637, filed May 9, 2011, Burnham; Jeffrey C.
U.S. Appl. No. 13/104,127, filed May 10, 2011, Burnham; Jeffrey C.
U.S. Appl. No. 12/981,933, filed Dec. 30, 2010, Burnham; Jeffrey C.
PCT Search Report PCT/US06/006220—Aug. 15, 2007.
PCT Search Report PCT/US06/008536—Apr. 16, 2008.
PCT Search Report PCT/US06/036085—Apr. 19, 2007.
PCT Search Report PCT/US08/054315—Jun. 5, 2008.
PCT Search Report PCT/US10/062504—Sep. 21, 2011.
PCT Written Opinion PCT/US06/006220—Aug. 15, 2007.
PCT Written Opinion PCT/US06/008536—Apr. 16, 2008.
PCT Written Opinion PCT/US06/036085—Apr. 19, 2007.
PCT Written Opinion PCT/US08/054315—Jun. 5, 2008.
CA Exam Report for PCT 2006/36085 dated Oct. 22, 2012.

* cited by examiner

BIOORGANICALLY-AUGMENTED HIGH VALUE FERTILIZER

REFERENCE TO RELATED APPLICATIONS

This application claims priority to U.S. Provisional Application Ser. No. 61/291,205, filed Dec. 30, 2009, entitled "Bioorganically-Augmented High Value Fertilizer," which is hereby specifically and entirely incorporated by reference.

BACKGROUND

1. Field of the Invention

This invention is directed to systems, devices, and methods for a continuous flow manufacturing process for a fertilizer, especially a high nitrogen, organically augmented, inorganic, ammonium based, slow-release or controlled-release fertilizer. The invention is also directed to advantageously taking advantage of the exothermic reaction of mixed compounds to enhance the nitrogen composition of the fertilizer and the breakdown of unwanted macromolecules. The invention further decreases the amount of greenhouse gas emissions and is basically carbon neutral. The invention is also directed to products produced by the processes of the invention.

2. Description of the Background

The disposal of biosolids discharged from municipal wastewater treatment plants is a serious and growing problem. In 1990, the United States Environmental Protection Agency indicated that a family of four discharged 300 to 400 gallons of wastewater per day and in 2000 this number has almost doubled. From this wastewater, publicly owned treatment works generate approximately 7.7 million dry metric tons of sludge (or "biosolids" as these municipal sludges are now called) annually or about 64 dry pounds of biosolids for every individual in the United States.

The definitions of "sewage sludge" and "sludge" and "biosolids" under Title 40 of the Code of Federal Regulations, Part 257.2, hereby incorporated by reference, is as follows:

"Sewage sludge means solid, semi-solid, or liquid residue generated during the treatment of domestic sewage in a treatment works. Sewage sludge includes, but is not limited to, domestic septage; scum or solid removed in primary, secondary or advanced wastewater treatment processes; and a material derived from sewage sludge. Sewage sludge does not include ash generated during the firing of sewage sludge in a sewage sludge incinerator or grit and screenings generated during preliminary treatment of domestic sewage in a treatment works. Sludge means solid, semi-solid or liquid waste generated from municipal, commercial, or industrial wastewater treatment plant, water supply treatment plant, or air pollution control facility or any other such waste having similar characteristics and effect."

The term sludge also encompasses substances such as, but not limited to municipal dewatered biosolids, domestic septage, heat-dried biosolids, pharmaceutical fermentation wastes, microbial digests of organic products such as food stuffs, food byproducts, animal manures, digested animal manures, organic sludges comprised primarily of microorganisms, and any combinations thereof.

There are several types of biosolids produced from sewage and/or wastewater treatment. These include primary biosolids, waste-activated biosolids, pasteurized biosolids, heat-treated biosolids, and aerobically or anaerobically digested biosolids, and combinations thereof. These biosolids may be from municipal and/or industrial sources. Thus, biosolids can comprise macromolecules including proteins, nucleic acids, fats, carbohydrates and lipids. Biosolids can comprise pharmaceutical compounds including waste products from their manufacture, antibiotics, hormones, hormone-like molecules, other biologically active compounds and macromolecules.

Commonly, but inadequately, biosolids are merely dewatered to the best extent possible by chemical and mechanical means. The water content of sewage biosolids is still very high, and none of the undesirable compounds listed above are neutralized. Typical biosolids coming out of a gravity clarifier may have a dry solids content of two percent or less. After anaerobic digestion, the solids content can be about ten percent. Cationic water-soluble polymers have been found useful for causing further separation between the solids and the water that is chemically and physically bound. Filtration or centrifugation of cationic polymer treated biosolids typically yields a paste-like biosolids cake containing a range of solids.

Drying of sewage biosolids (to greater than 90 percent solids) has been practiced for many years in both the United States and Europe. Biosolids drying in the United States prior to about 1965 was undertaken to reduce transportation costs and in pursuit of various disposal options. In some plants, the biosolids are dried in powder form and the fine particles are consumed in the combustion chamber of an incinerator or boiler. In the late 1960's two municipalities, Houston and Milwaukee began to market a pelletized or granulated dried biosolids for use as a soil amendment and/or fertilizer. Several more plants for manufacture of dried pelletized biosolids were built in the 1980's and 1990's; especially after ocean dumping of biosolids by coastal cities was eliminated. Drying and conversion to a heat-dried biosolids pellet fertilizer was the best option for these metropolitan areas where landfills and land for disposal were limited. However, the investment required for a biosolids drying facility is very large resulting in tremendous municipal costs per dry ton of biosolids.

A common biosolid that is dried and pelletized is anaerobically-digested municipal sewage. Anaerobic digestion, as the name indicates, involves treatment by facultative bacteria under anaerobic conditions to decompose the organic matter in the biosolids. After a prescribed time and temperature, a biosolid, relatively free of putrifiable organic matter, is obtained. Typically, pathogens remain in such biosolids, and the USEPA has classed such treated biosolids as "Class B" implying that they are of a lower standard than the "Class A" treated bio solids. Because Class B biosolids contain pathogen indicators—and therefore potential pathogens, they are restricted in the manner by which they can be applied to animal and human crops. In contrast, Class A biosolids, e.g., heat-dried biosolids pellets, as well as the product of the present invention, are not restricted under current USEPA standards as fertilizer for animal or human crop usage.

If pathogens (e.g. *Salmonella* sp. bacteria, fecal coliform indicator bacteria, enteric viruses, and viable helminth ova) are below detectable levels, the biosolids meet the Class A designation. The Part 503 rule (Title 40 of the Code of Federal Regulations, Part 503, incorporated herein by reference) lists six alternatives for treating biosolids so they can be classified in Class A with respect to pathogens. Alternative 1 requires biosolids to be subjected to one of four time-temperature regimes. Alternative 2 requires that biosolids processing meets pH, temperature and air-drying requirements. Alternative 3 requires that when biosolids are treated in other processes, it must be demonstrated that the process can reduce enteric viruses and viable helminthes ova, and operating conditions used in the demonstration after pathogen reduction demonstration is completed must be maintained. Alternative 4 requires that when treated in unknown processes, biosolids be tested for pathogens at the time the biosolids are used or disposed or, in certain situations, prepared for use or disposal. Alternative 5 requires that biosolids be treated in one of the Processes to Further Reduce Pathogens. Alternative 6 requires that biosolids be treated in a process equivalent to one of the Processes to Further Reduce Pathogens, as determined by the permitting authority.

Class A pathogen biosolids must also possess a density of fecal coliform of less than 1,000 most probable numbers (MPN) per gram total solids (dry-weight basis) or a density of *Salmonella* sp. bacteria of less than 3 MPN per 4 grams of total solids (dry-weight basis). Either of these two requirements must be met at one of the following times: when the biosolids are used or disposed; when the biosolids are prepared for sale or give-away in a bag or other container for land application; or when the biosolids or derived materials are prepared to meet the requirements for Exceptional Quality biosolids.

All biosolids applied to the land must meet the ceiling concentration for pollutants, comprising ten heavy metal pollutants: arsenic, cadmium, chromium, copper, lead, mercury, molybdenum, nickel, selenium, and zinc. If a limit for any one of these is exceeded, the biosolids cannot be applied to the land without the incorporation of significant restrictions. Exceptional Quality (EQ) is a term used by the USEPA Guide to Part 503 Rule 7 to characterize biosolids that meet low-pollutant and Class A pathogen reduction (virtual absence of pathogens) limits and that have a reduced level of degradable compounds that attract vectors.

Pathogen reduction takes place before or at the same time as vector attraction reduction, except when the pH adjustment, percent solids vector attraction, injection, or incorporation options are met. Finally, vector attraction reduction must be met when biosolids are applied to land. Commonly, this is achieved by drying the biosolids product to a level of greater than 90 percent solids.

Biosolids that are merely dried, as with heat-dried pellets, even if dried to greater than 90 percent solids, have several disadvantages for agricultural use. Biosolids have a low fertilization value, typically having nitrogen content of only about two to five percent. Freight and application costs per unit of nitrogen are high. The heat-dried biosolids often have a disagreeable odor, particularly when moist. Also, dried pellets have low density and hardness and when blended with other commercial fertilizer materials, the pellets may segregate, and disintegrate and may not spread on the field uniformly with other more dense ingredients. The disagreeable odor associated with the use of biosolids, unless adequately treated, will continue to be present during further processing of a nitrogen rich fertilizer product, and can continue to be present in the final product. This complicates the placement of suitable fertilizer processing plants to locations that are not in close proximity to residential communities. Additionally, the longer distance that biosolids must be transported adds to the cost and logistics of disposing of this waste product. Another disadvantage to current biosolids-enhanced fertilizers is that bacterial action may continue when the material becomes moist, and under storage conditions, the material's temperature may rise to the point of auto-ignition. Hence, except for special markets that value its organic content for soil amendment or filler in blended fertilizer, there is relatively poor demand for the heat-dried biosolids product. In many cases municipalities must pay freight charges, or may offer other incentives for commercial growers to use the material. However, this is frequently still more economical than alternative disposal schemes.

The market value for agricultural fertilizers is principally based on their nitrogen content. A need exists for a practical, safe and economic method for increasing the nitrogen content of biosolids to a level approaching that of commercial mineral fertilizers, e.g., eight to twenty percent. If such a biosolids fertilizer could be manufactured then the overall value of the biosolids product and demand for the product would likely increase. Moreover, a properly manufactured biosolids fertilizer will have an advantage in that much of its nitrogen will be of the slow release type. Slow-release or controlled release fertilizer is one in which the nutrient, e.g., nitrogen, becomes available in the soil column at rates much slower than fast-available nitrogen as from traditional fertilizers such as urea, ammonium sulfate and diammonium phosphate. This is very desirable and provides nitrogen to the plant throughout the plant growing cycle with the implication that less nitrogen needs to be applied to the soil or crop thereby reducing the potential of environmental contamination and reducing the cost of fertilizer usage. Traditional inorganic manufactured slow release nitrogen fertilizers have a price many times that of ordinary mineral nitrogen fertilizers. Under the scenario of high nitrogen biosolids-containing fertilizer production from their biosolids, municipalities would enjoy public and regulatory support for their biosolids disposition program. Such a program would ensure the regular removal of their dewatered or dried biosolids, for example, by recycling biosolids into a high nitrogen fertilizer which then can be sold directly into the mature national fertilizer distribution industry, thereby eliminating one of the major problems traditionally associated with biosolids treatment programs.

Prior attempts have been made to reach some of these objectives. U.S. Pat. Nos. 3,942,970, 3,655,395, 3,939,280, 4,304,588, and 4,519,831 describe processes for converting sewage biosolids to fertilizer. In each of these processes a urea/formaldehyde condensation product is formed in situ with the biosolids. Thus, the processes require the handling of formaldehyde, a highly toxic lachrymator and suspected cancer-causing agent.

Other processes require costly process equipment and/or special conditions not readily incorporated in existing sewage treatment facilities (see, Japanese Patent No. 58032638; French Patent No. 2,757,504).

A simple method for increasing the nitrogen in biosolids would be to blend commercial nitrogen fertilizer materials to the wet biosolids prior to drying and pelletizing. There are only a few high-nitrogen fertilizer materials that are economical for use in agriculture. Examples include: ammonia (82 wt. percent N), urea (46 wt. percent N), and ammonium nitrate (33.54 wt. percent N). Ammonia has high volatility and is subject to strict regulation of discharges to the atmosphere. Urea is a solid that adsorbs moisture quite readily and makes the sludge more difficult to dry. Urea is also highly susceptible to breakdown to ammonia by the microbes and enzymes in biosolids if they are not properly prepared, resulting in nitrogen loss and an odor problem. Ammonium nitrate is a strong oxidizer and can result in a potential explosion problem which has all but eliminated this fertilizer from the commercial market after 2000. All of these fertilizers have high nitrogen content, but are less than ideal for combining with biosolids absent special processing.

Other references, such as European Patent No. 0143392, Japanese Patent No. 9110570 A2, and "Granulation of Compost From Sewage Sludge. V. Reduction of Ammonia Emission From Drying Process", Hokkaidoritsu Kogyo Shikenjo Hokoku, 287, 85-89 (1988)) fail to disclose the use of acids with ammonium sulfate additions and do not discuss the issue of corrosion of steel process equipment under acid conditions.

Over the past thirty years alkaline stabilization of biosolids has been a standard and successful method of making biosolids into beneficially useful materials that can be used principally as soil-conditioning materials. Because these alkaline stabilized biosolids products have high calcium carbonate equivalencies, they have been produced and marketed as Agricultural liming or Ag-lime materials, usually as a replacement for calcium carbonate in farm soil management strategies. Because of this usage, the value of these materials has been restricted to only a few dollars per ton of product. However, transportation costs are high in large part due to the significant water content of the material. Amounts of water up to fifty percent render transportation economically and geographically restricted to areas close to the source of their treatment.

Thus, there is a long standing need for practical means of increasing the economic value of sewage biosolids through increasing its nitrogen content, and increasing the ability to be spread as well as a need to treat these materials such that they are converted into commodity fertilizers with physical and chemical and nutrient properties such that they can command significant value in the national and international commodity fertilizer marketplace. A series of U.S. Pat. Nos. 5,984,992; 6,159,263; 6,758,879 and 7,128,880 describe methods of production of high nitrogen organically enhanced ammonium sulfate fertilizers made with biosolids utilizing a pipe-cross reactor as originated by the Tennessee Valley Authority. The pipe, tee and pipe-cross reactor are defined by the IFDC in the Fertilizer Manual (1998), p 440 as: "the pipe reactor consists basically of a length of corrosion-resistant pipe (about 5-15 m long) to which phosphoric acid, ammonia and often water are simultaneously added to one end through a piping configuration resembling a tee, thus the name 'tee reactor.' The tee reactor was modified by TVA to also accept an additional flow of sulfuric acid through another pipe inlet located opposite the phosphoric acid inlet, giving the unit a "cross" configuration and thus the name "pipe-cross reactor".

Both the IFDC *Fertilizer Manual* (1998) and the Fertilizer Technical Data Book (2000) refer to the pipe-cross reactors. Pipe-cross reactors deliver a concentrated mix to the granulator shaping device and more efficiently evaporate undesired water from the fertilizer mix than other devices, but these references demonstrate a long-felt need for improvement, indicating that one of the shortcomings of the pipe-cross reactor is scale formation inside the pipe which can result in clogging.

The methodologies taught by this group of patents (U.S. Pat. Nos. 5,984,992; 6,159,263; 6,758,879 and 7,128,880) are plagued by problems related to the blockage of these narrow relative to their length reaction "pipe-like" reactor configurations during operation and related to the difficulty of control of the reaction temperature and pressure and retention time of the mix within such pipe-cross reactors. These pipe-cross reactors are narrow in contrast to their length, e.g., up to six to eight inches in diameter and often fifteen feet in length or longer. The plant practicing the manufacture of organically-enhanced ammonium sulfate fertilizers often had to shut down and disassemble the pipe-cross reactor either due to blockage from biosolids buildup or from destructive over heating in such reactors such that the commonly used Teflon® coating on the interior-reaction side of the reactor was melted and ruined. Further, the use of the pipe-cross reactor has the distinct disadvantage of having very short reactor retention times (usually less than twenty seconds) which is an advantage in the manufacture of traditional fertilizers like ammonium sulfate but is a disadvantage when coupled to the simultaneous process of biosolids. Such short processing time increases the probability of untreated or non-homogenous mixing as the three material inputs pass through this reactor. Also limiting is the lack of control over the atmospheric pressure within such pipe-cross reactors since these reactors have open-ended discharges usually directly into a granulator. Related to but distinct from the lack of control of internal pressures, pipe-cross reactors also have little to no temperature control over the mix passing through the reactor.

U.S. Pat. No. 4,743,287 to Robinson describes a method to use two reaction vessels in sequence to incorporate organic biosolids into nitrogen fertilizers of low or medium nitrogen concentration (a range of four weight-percent nitrogen to a maximum of nitrogen concentration of ten weight-percent). Robinson uses his first reaction vessel to achieve very low pH values of the mixture (pH 0.2 to 1.5) to achieve hydrolysis of molecules present and to prepare the mix for reaction in a second reaction vessel. Robinson does indicate that a single reactor can be used, but only in a batch configuration and not in a continuous flow manufacturing method. Robinson also indicates that the acid and ammonia may not be injected in any order, but must be injected in sequence. This patent describes the reaction vessels capable of achieving high pressures (30 psig) with relatively long retention times as compared to the pipe-cross reactors. However, Robinson fails to meet the need for a novel and practical continuous flow method of manufacturing high nitrogen (greater than 8 wt. percent nitrogen) and biosolids-containing fertilizer products under the advantages of defined temperatures, pressures and reaction retention times. Thus, an urgent need exists for an effective, efficient, and economical process for treating biosolids.

SUMMARY

The present invention overcomes the problems and disadvantages associated with current strategies and designs and provides new tools and methods for the processing of biosolids into a safe commercially viable natural slow-release fertilizer.

One embodiment of the invention is directed to methods for a continuous treatment of biosolids comprising: forming an acidified paste of dewatered biosolids and one or more first acids; adding the acidified paste to a pressure vessel such that the pressure vessel maintains a head space wherein the head space has a predetermined pressure; adding one or more second acids and one or more bases to the pressure vessel to combine with the acidified paste and form a mixture; subjecting the mixture to a temperature and pressure for a retention time, wherein the temperature and moisture content of the mixture are determined by the head space pressure; removing the mixture from the pressure vessel; and drying the mixture to form treated and dried biosolids. Biosolids that can be utilized comprise one or more of municipal biosolids, heat-dried biosolids, pharmaceutical fermentation wastes, microbial digests of organic products, food stuffs, food byproducts, animal manures, digested animal manures, organic biosolids, biosolids containing microorganisms, or combinations thereof. Dewatered biosolids are preferably created by subjecting biosolids to filtration, centrifugation, pressure, or a combination thereof. Preferably, the one or more first acids comprise at least phosphoric acid at a concentration of 50% or more, and more preferably 54%. Preferably, the acidified paste has a pH of from pH2-6, and more preferably from pH 3-4. Also preferably, the one or more second acids comprise phosphoric acid, sulfuric acid, or both, and the one or more bases comprise anhydrous or aqueous ammonia. More preferably the one or more second acids comprise sulfuric or both sulfuric and phosphoric and the pH is less than pH 2 and more preferably less than pH 1. Preferably the one or more bases is anhydrous ammonia and the pH increases to pH 2.5-4 or higher. The one or more second acids and the one or more bases together with the acidified paste create an exothermic reaction within the mixture. The pressure applied to the mixture prevents boiling and quiets the overall reaction allowing the temperature to have maximal effect on the macromolecules within the biosolids. Preferably the exothermic reaction takes place without external heating and the mixture is maintained at a temperature of 230° F. or greater. Optionally, one or more ferrates and/or one or more oxidizing agents may be added to the mixture. Preferably, the one or more ferrates are a calcium ferrate, a sodium ferrate, a potassium ferrate, ferrous sulfate heptahydrate, or combinations thereof. Also preferably, the one or more ferrates are formed from reaction of a solid-state sodium hydroxide with sodium hypochlorite and ferric chloride. The one or more oxidizing agents are preferably hydrogen peroxide, calcium hypochlorite, sodium hypochlorite, potassium hypochlorite, chlorine dioxide, ozone, oxygen, or combinations thereof. Retention time of the mixture within the pressure vessel is preferably 30 minutes or less, more preferably 15 minutes or less, and even more preferably 10 minutes or less. One or more of acidity, pressure, flow speed, pH, and base infusion speed are preferably controlled by closed-loop computer controls to maintain a predetermined reaction temperature. Also preferably, the biosolids are continuously processed through the pressure vessel, thereby continuously forming the treated and dried biosolids. Macromolecules within the treated and dried biosolids are partially or preferably completely hydrolyzed, denatured, and/or sterilized. Organic material within the biosolids may include one or more of pharmaceutical compounds, antibiotics, hormones, hormone-like molecules, biologically active compounds, macromolecules, carbohydrates, nucleic acids, fats, lipids, proteins, or combinations thereof. Preferably the phosphate content of the dried mixture is from 0.5% to 4%, and the nitrogen content is enhanced by aqueous ammonia that is added to the reaction vessel. Preferably, a granulating agent is added to the mixture before drying to form a dried and granulated mixture. The method may also involve crushing the dried and granulated mixture and passing the dried and granulated mixture through one or more screens to isolate granules of a predetermined size. The dried granules may also be coated with a coating agent that is applied to the granules within a cooling apparatus that cools the dried and granulated mixture to a temperature of 140° F. or less. A preferred cooling apparatus is a fluidized bed, an ammonia chiller, or a rotating drum.

Another embodiment of the invention is directed to methods as described above and involving passing the reaction mixture through a second pressure vessel.

Another embodiment of the invention is directed to methods further comprising adding one or more plant nutrients to the mixture in the pressure vessel. Preferred plant nutrients include urea, ammonium nitrate, ammonium sulfate, monoammonium phosphate, diammonium phosphate, urea ammonium nitrate, liquid urea, potash, iron oxide, soluble iron, chelated iron and combinations thereof. One or more hardening agents may also be added to the mixture. Preferred hardening agents include ferric oxides, alum attapulgite clay, industrial molasses, lignon, ligno sulfonate, urea formaldehyde polymerize and combinations thereof.

Another embodiment of the invention comprises methods for treatment of biosolids comprising: combining dewatered biosolids with an acid to form a mixture; injecting the mixture and steam into a pressure vessel containing a pressurized head space; subjecting the mixture to a predetermined temperature and pressure for a retention time, wherein the temperature and moisture content of the mixture are determined by the head space pressure; removing the mixture from the pressure vessel after the retention time; and drying the mixture.

Another embodiment of the invention is directed to biosolids treated and processed by the methods of the invention.

Another embodiment of the invention is directed to systems for processing biosolids into fertilizer, comprising: a first mixer that blends the biosolids with concentrated acid and oxidizing agents and converts the biosolids into a pumpable paste; a pressure vessel with a head space pressure that receives the pumpable paste from the first mixer, wherein the pressure vessel retains the pumpable paste at a predetermined pressure and temperature as determined by the head space pressure and for a period of time; a second mixer that receives the pumpable paste from the pressure vessel, wherein the pumpable paste is mixed with a hardening agent; and a granulator to break the hardened paste into pelletized fertilizer. Preferably, the system contains a steam generator, wherein steam produced by the steam generator is injected into the first mixer. Also preferably, the system comprises a plurality of valves to control at least one of steam levels, mixture levels, temperature, presser, pH, and nitrogen levels, wherein air discharge from the facility is less than 30 CFM. The system may further comprise an ammonia vaporizer and a baghouse dryer.

Another embodiment of the invention is directed to pressure vessels for processing biosolids according to the methods of the invention comprising a head space and a plurality of valves that control head space pressure, wherein head space pressure determines the temperature and moisture content of biosolids within the vessel, and further comprising gauges that indicate one or more of temperature, pressure, pH, and nitrogen content of the biosolids within the pressure vessel.

Other embodiments and advantages of the invention are set forth in part in the description, which follows, and in part, may be obvious from this description, or may be learned from the practice of the invention.

DESCRIPTION OF THE INVENTION

Figure 1A:
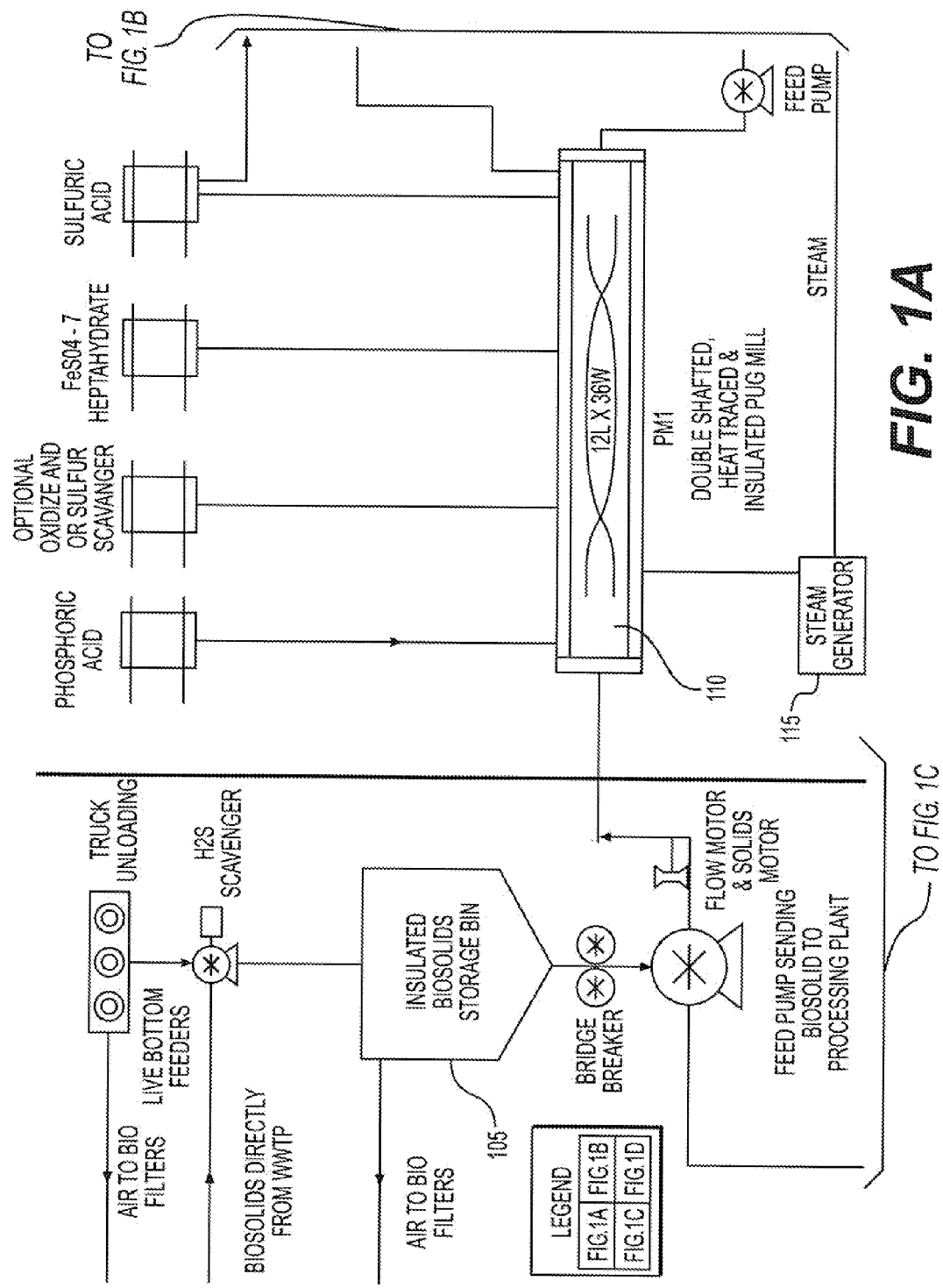
FIG. 1. Biosolid Fertilizer Plant Flow Chart.
Figure 1B:
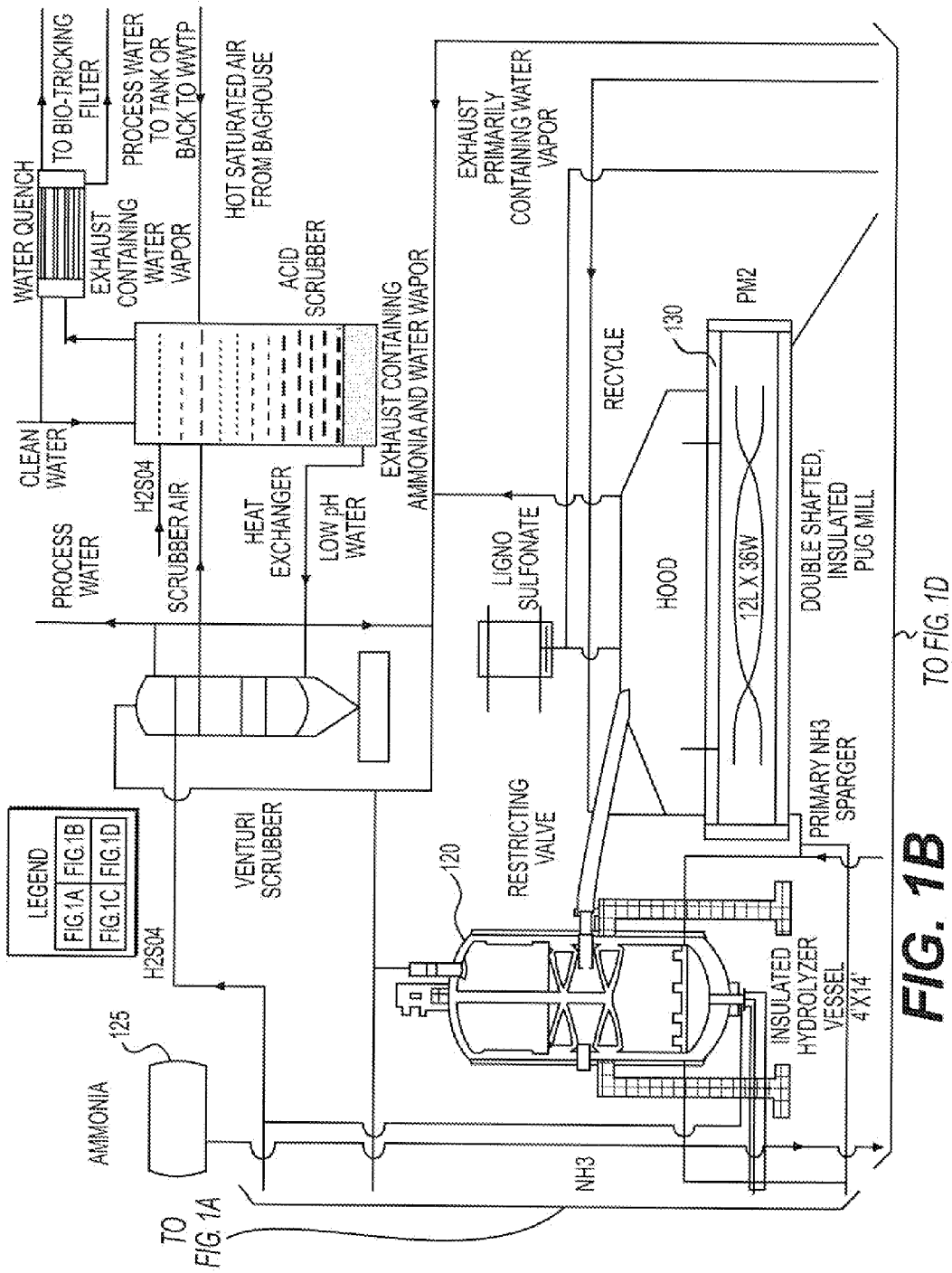
Figure 1C:
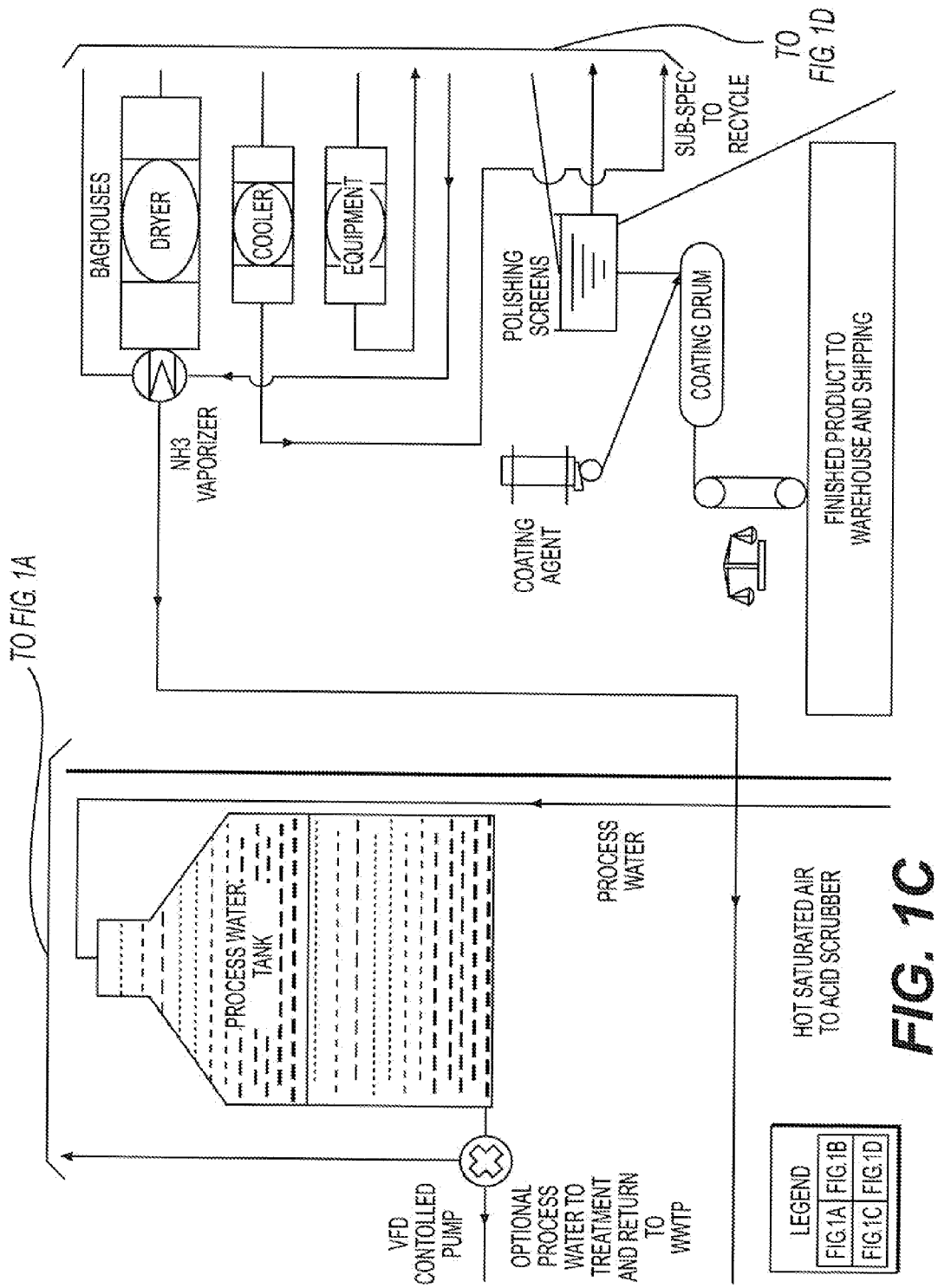
Figure 1D:
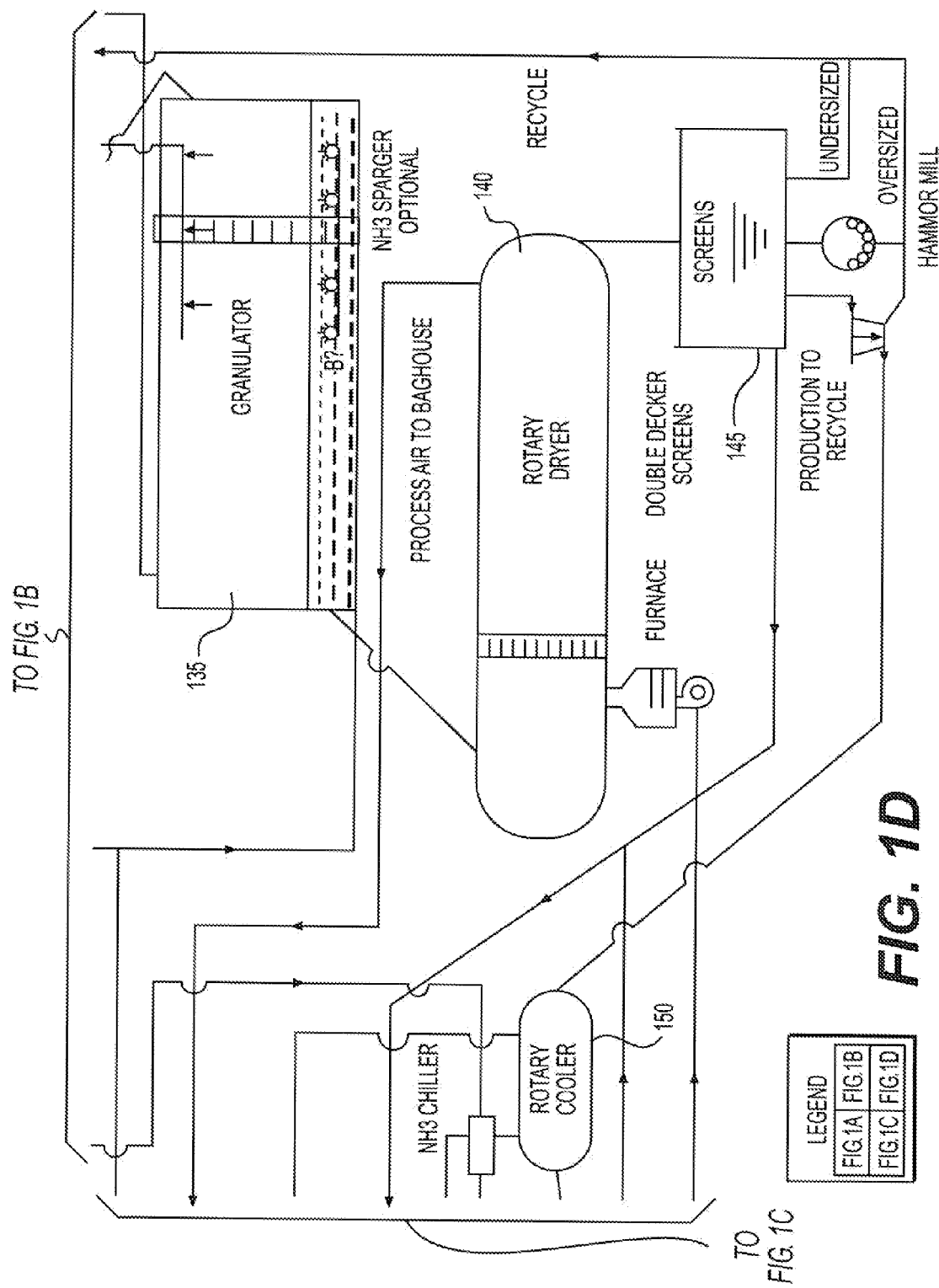

Biosolids, especially in the form of sewage sludge from wastewater processing, pose a major disposal problem and community expense. Traditional processing results in dewatered biosolids that poses an odor and potential pathogen problem. Alternatively, processing can produce a fine powder that is either burned or transported to disposal sites. Biosolids processing may also involve heat treatment to inactivate microorganisms and other potentially contaminating materials. These processed biosolids are considered low-value fertilizers and dispersed on crops and large agricultural areas. All of these solutions are unsatisfactory and attempts have been made to sterilize the biosolids for use as a fertilizer with minimal success.

It has been surprisingly discovered that high-value fertilizer can be efficiently manufactured from raw and semi-processed biosolids. The efficiency involves a continuous flow manufacturing process augmented with nitrogen from ammonium and possibly other nitrogen sources as well. The invention also takes advantage of the thixotropic property that results from the preliminary processing of biosolids. Vigorous agitation, mixing or other shear action of the preliminary processing produces a pumpable fluid. The invention preferably involves creating an exothermic reaction that breaks down and destroys macromolecules. The process preferably involves controlling unwanted odors through the addition of odor-control agents and odor control processing steps. The manufacturing facility for the process of the invention minimizes the amount of water needed, as well as the overall power utilization and amount of waste byproducts formed. Thus, manufacturing can be sized to service the needs of the size of the particular community in which the plant is located. This tailoring design allows for a biosolids processing/fertilizer manufacturing plant that can process less than 3 tons per hour of dewatered biosolids or scaled up for larger plants (e.g., up to 10 to 12 tons per hour or more). This sizing feature reduces costs, allows for standardization with interchangeable equipment and the efficiency of the operational logistics as well as overall liability. Manufacturing plants of the invention preferably allow for adjacent storage facilities. Being adjacent, transportation logistics are simplified or eliminated thereby reducing transportation costs of the product as well as the transportation costs of input biosolids. The invention preferably provides for an odor control system to ensure community acceptance of the manufacturing plant and to facilitate meeting USEPA standards as well as making the process more efficient through the capture and incorporation of valuable nitrogen or other potential and/or fugitive plant nutrients from the processed air of the plant.

One embodiment of the invention is directed to processing biosolids as close to the treatment plant as possible, minimizing transport and potential spillage of potentially harmful compounds. This is accomplished by taking biosolids directly from waste water treatment plants. Preferably the biosolids are dewatered to 18 to 30 percent solid content. Taking advantage of the thixotropic property of many types of dewatered biosolids to take on the properties of pastes or paste-like, pump-able fluids, the biosolids are pumped into a pug-mill. This pumpable biosolid is preferably initially conditioned by injection of steam, water, and heat from inline heaters to further enhance the flow of the biosolids for further conditioning in a double shafted pug-mill. In this initial pug-mill the biosolids are thoroughly mixed or blended with chemical additives such as oxidizing agents, for the initial odor control and to prepare the biosolids for reaction in the pressure vessel. In this step the initial acidification and odor control of the biosolids are also achieved by infusion of a black or agricultural grad phosphoric acid at a strength of 50 percent or greater and preferably 54 percent strength. This phosphoric acid is added such that the final concentration of phosphate in the fertilizer granules is between 0.5 percent and 6 percent and preferably between 1.5 percent and 4 percent and more preferably between 2 percent and 3 percent. Additionally, one or more plant nutrients can be added to this pug-mill to enhance the composition of the biosolids paste to prepare it as a fertilizer. Ferrous sulfate heptahydrate also can be added to facilitate additional purification of the bio solids paste.

After the biosolids exit the first pug-mill, they are pumped to the pressure vessel where liquid ammonia and sulfuric acid is injected into the biosolids, resulting in an exothermic reaction and preferably a violent one. The pressure vessel is constructed in a manner to allow a vigorous continuous exothermic reaction with the conditioned acidic biosolids paste and ammonia. In another embodiment of this invention, the residence time through the pressure vessel is up to 15 minutes at temperatures exceeding 230° F. (110 C). In a preferred embodiment, the entire reaction process is controlled by a closed loop computer control that continuously monitors and adjusts the exothermic reaction through addition of sulfuric acid, ammonia, plant nutrients, pH adjusters and pressure control. The preferred control mechanism is through adjustment of the head space pressure above the biosolids in this pressure vessel. In the preferred embodiment this head pressure is controlled between 35 and 80 psig (or higher), more preferably 62 psig, which regulates the level of the mix within the pressure vessel and thereby controls the outflow of the mix exiting the vessel. Other embodiments of this pressure level have been conducted at pressures as low as 20 psig and as high as 60 psig. The entire process is carried out without the need for additional application of heat or stopping the continuous flow of biosolids into and out of the pressure vessel. The biosolids, due to the temperature, pressure, mixing and retention time in the hydrolysis vessel undergo partial or complete hydrolysis, denaturization, sterilization, or combinations thereof for the components of the conditioned biosolids.

Upon exiting the upper portion (preferably allowing for a 25 percent head space volume above the biosolids) of the pressure vessel the conditioned reactive mixture of biosolids enter a second pug-mill wherein the final adjustments are made to the biosolids in preparation for drying. The pH at this point is preferably from about 5.5 to about 7, and more preferably 6.2. Odor control agents can be added continuously from the initial flow into the first pug-mill, through the pressure vessel, and in the final pug-mill processing.

After processing through the second pug-mill further drying, granulation, screening, packaging and recycling of processed biosolids occur. In a preferred embodiment upon exit from the second pug-mill the biosolids enter a granulator, which forms the pellets/granules of the finished high nitrogen fertilizer. They are then processed through a rotary dryer, which further dries the bio solids fertilizer to less than 1% water content. Upon exiting the rotary dryer the biosolids fertilizer is further screened for size and separated into product, undersize and oversize granule groups. The undersized particles are recycled back into the entrance of the second pug-mill. The oversized particles are sent to a hammer mill where they are crushed and then recycled back into the entrance of the second pug-mill. After leaving the screening process the bio solids fertilizer granules are processed through the rotary cooler where the biosolids fertilizer is cooled. The fertilizer granules empty into the final polishing screens to remove undersize granules or dust created in the cooling process. After processing through the polishing screens, the product passes through a coating drum where a coating agent that inhibits dusting is added. The biosolids fertilizer is then warehoused ready for bulk shipping or subsequent packaging. Another embodiment of the invention is the air polishing system that continuously recycles the hot air generated in the cooling process to the drying stage resulting in a reduction in fuel usage and waste air for processing. The air drawn from the screens and equipment is cleaned in a dust collector, cooled through a heat exchanger and reused as inlet air to the cooler. The heated air discharging from the cooler is again cleaned in a dust collector. The cleaned, heated air is used as inlet air for the rotary dryer.

In another preferred embodiment the liquid ammonia infusion lines are passed through a heat exchanger placed in the dryer discharge air stream. Ammonia is vaporized and superheated in the heat exchanger and is then utilized in the reactor which increases energy to the critical chemical reaction zone of the process and significantly reduces the fuel energy required for drying. In an additional benefit of this heat exchange, the dryer discharge air stream is partially cooled by the ammonia vaporization reducing the cooling load on the discharge air treatment system.

An output of the biosolids processing of the invention is a high nitrogen, slow release biosolids fertilizer. In a preferred embodiment the invention results in a 16-2-0-17-1-15 (Sodium-Phosphorus-Potassium-Sulfur-Iron-Organics) slow release granular fertilizer that is 99 percent dry and exceeds the United States Environmental Protection Agency (USEPA) Class A requirements and Exceptional Quality (EQ) Standards. The 16 percent controlled-release organic nitrogen component helps bind the nitrogen in the root zone when and where it is needed.

The invention comprises a major improvement as compared to traditional or conventional fertilizer manufacturing practices in which a large manufacturing facility is located as far away from communities as possible thereby requiring that input materials be shipped over long distances to operate the plant. A good example of this problem was the biosolids conversion-to-fertilizer plant located in Helena, Ark. which practiced the manufacturing processes taught in U.S. Pat. Nos. 5,984,992; 6,159,263; 6,758,879; and 7,128,880. For this fertilizer manufacturing plant, the biosolids containing between 70 percent and 80 percent water were shipped to the facility from areas of New York including New York City and Westchester County. This transportation requirement adds a tremendous cost to the manufacturing process. The present invention eliminates this type of problem by locating the physical equipment necessary to perform the manufacturing process adjacent or close to the source of the biosolids. Such sources are typically municipal wastewater treatment plants. For example, the processes of the invention have the advantage that they may be interfaced with other unrelated ammonium production facilities. Those facilities may be associated with an unrelated commercial enterprise such as, for example, nylon or steel production. In these two industries hot ammonium sulfate is created as a by-product to the manufacture of product. By co-locating a processing facility of the invention at these types of sites, the otherwise unwanted by-products such as ammonium sulfate need not be carted away, but can be directly utilized in the manufacture of fertilizer according to the present invention.

The present invention allows for the treatment of most any organic biosolids materials, such as municipal dewatered biosolids, domestic septage, pharmaceutical fermentation wastes, and microbial digests of other organic products such as food stuffs and/or animal manures or digested animal manures, to name a few. These biosolids are typically from 12 to 40 percent solids and preferably between 18 and 30 percent solids. This treatment process can preferably result in the production of a granular or pelleted USEPA Class A fertilizer product of suitable dryness, hardness, and chemical quality to produce a valuable, high-nitrogen, slow release commercial fertilizer product that is capable of competing in the national and international marketplace against traditional inorganic fertilizers. A commercial, high-nitrogen fertilizer preferably has greater than 8 percent nitrogen by dry weight of the finished fertilizer and more preferably at least 16 percent nitrogen by dry weight of the finished fertilizer. The Class A characteristic refers to the microbiological quality of the finished fertilizer product, which meets the United States Environmental Protection Agency Class A microbiological standards for a product containing municipal bio solids as defined in 40 C.F.R. §503. The processes of the present invention meet or exceed this standard on the basis of the stress condition and the retention time utilized, and on the basis that the finished fertilizer is greater than 80 percent, and more preferably greater than 90 percent dry solids with the optimal level being over 98 percent dry solids in composition. Thus, ensuring that the associated USEPA Vector Attraction Standards are met (90 percent or greater), that the finished fertilizer granule is optimized for minimal water content increasing hardness characteristic and eliminating water with respect to transportation of the finished fertilizer. Hardness is provided by adding to the fertilizer mix, prior to shaping, one or more hardening agents selected from the group consisting of ferric oxides, alum, attapulgite clay, industrial molasses, lignon, lingo-sulfonate, urea formaldehyde polymerization and combinations thereof.

The processes of the present invention produce a fertilizer that is preferably safe to handle and work with and preferably meets and/or exceeds the minimum requirements of a USEPA Class A biosolids. Fertilizer product is preferably sterilized and biological and chemical contaminants are at least partially and preferably completely hydrolyzed and denatured to the point of inactivation and/or destruction. Typical biological or chemical contaminants include, but are not limited to one or more of pharmaceutical compounds, antibiotics, hormones, hormone-like molecules, biologically active compounds, macromolecules, carbohydrates, lipids, proteins, nucleic acids, and combinations thereof.

The present invention preferably includes a stress conditioning over a predetermined retention period that creates an autoclave effect. This autoclave effect destroys and/or inactivates or simply sterilizes the biosolids. Microorganisms in the biosolids, including for example, bacteria, viruses, fungi, parasites, parasite eggs, bacterial and fungal spores and combinations thereof, re destroyed and/or inactivated. In addition, the processes of the invention are preferably designed to hydrolyze macromolecules such as proteins, nucleic acids, lipids, fats, carbohydrates and combinations thereof, and/or other biologically-active substances that may be present.

According to preferred aspects of the invention, biosolids are subjected to stress conditions, which include, but are not limited to one or more of extremes of pH, agitation, elevated pressures, and elevated temperatures, which, combined with a controlled or predetermined retention period, result in a mix and/or a fertilizer that is safer as compared to product processed utilizing conventional technologies such as pipe-cross reactor technologies. The capability to control or predetermine the retention period is important in selecting the preferred properties of the resulting product. In other words, retention time (R) of the biosolids in the pressure vessel is preferably determined on the head pressure (p) and the volume (v) of material in the reactor (i.e., $R \propto p \cdot v$). Head pressure also determines the temperature within the pressure vessel. Some preferred pressures and the resulting temperatures are shown in Table 1.

TABLE 1

| Pressure (psi) | Temperature ° F. (C.) |
|---|---|
| 20 | 258.8 (126) |
| 30 | 274 (134.4) |
| 38 | 284 (140) |
| 60 | 307 (152.8) |

According to the preferred processes of the invention, a pressure control system maintains the desired pressure in the vessel at the head pressure, which in turn sets the desired temperature and simultaneously controls the level of material in the pressure vessel at the predetermined elevation. Preferred pressures include those listed above and higher, including 70 psi, 80 psi and higher. More preferably the head space pressure is about 62 psi. The pressure system preferably negates any pluggage due to the combination of the pressure and reactions occurring with the pressure vessel itself caused by mixing under the particular stress conditions selected. Control of the pressure also facilitates control of the ideal moisture for the reaction vessel as well as the ultimate moisture required for proper granulation and minimal drying energy. The pressure system preferably controls the desired pressure only at the level of the overflow. The system does not change the level of material with the vessel unless the system fails. Thus, when biosolids are subjected to controlled stress conditions of the reaction vessel (e.g., heat, pH, pressure) the biosolids as well as contaminants that are present are preferably completely inactivated. By adjusting the stress conditions, as can be determined empirically by those skilled in the art, a desired level of treatment can be achieved. Retention times can be set for most any period of time from minutes to hours and preferably are for a period of less than 60 minutes, more preferably less than 30 minutes, more preferably less than 15 minutes. Preferred retention periods are from 2 to 16 minutes or 1 to 12 minutes, and more preferably about 10 minutes or less. A series of mixers is preferably employed that may optionally be heated (e.g., single shafted or double shafted pug-mill type mixers, preferably a blending and mixing pug-mill utilizing an adjustable broad-shaped blade configuration). Additionally, the primary pressure reactor preferably incorporates mixing apparatus to insure sufficient agitation and mixing of biosolids with acids and injection of reactive ammonia species along the reaction path. The reaction between the concentrated acid or acids and the ammonia is violently exothermic and creates high heat, which maintains the resultant ammonium salt in the soluble molten state and any water present in the form of superheated steam. This exothermic reaction also creates significant pressure within the pressure vessel. This ammonium salt mix has a temperature characteristic that is about 100 C (212° F.) or higher and preferably a temperature of 121 C (250° F.) or higher, and more preferably a temperature of 149 C (300° F.) or higher, all of which may be dependent upon the nature of the ammonia being used in the reaction. If anhydrous ammonia is used, the temperature is preferably significantly higher than when aqueous ammonia is used, especially at 21 percent nitrogen.

The temperature and fluidity of the ammonium melt or salt is maintained such that when blended with the biosolids in the receiving pressure vessel, the temperature of the blend will meet of exceed 100 C (212° F.) and preferably meet or exceed 149 C (300° F.). The higher temperatures facilitate the hydrolysis of proteins and peptides in the biosolids in an acid environment creating advantageous properties to the final fertilizer product that result in increased crop production compared to fertilizers that do not contain such organic material (e.g., ammonium sulfate or ammonium phosphate or urea fertilizers). The pressure vessel preferably contains pressure and temperature gauges along its length for monitoring the pressure and temperature and further injection ports for adding additional reactive agents. The reactor vessel preferably possesses control systems that function as a closed loop system controlling the temperature, pressure, pH, reactive injection additions, and rate of flow of the molten fertilizer melt through the system.

Biosolids treated according to the processes of the invention typically contain low levels of metals such as arsenic, cadmium, copper, lead, mercury, molybdenum, nickel, selenium and/or zinc. Low levels are levels below what are considered harmful and less than the Exceptional Quality ("EQ") standard for metals as published by the USEPA for products containing municipal biosolids.

By exceeding the USEPA regulation and the hydrolyzing conditions of the hydrolyser or pressure vessel for macromolecules (e.g., personal pharmaceutical products such as antibiotics or hormones or hormone-like substances), the resulting fertilizer is safe for use in and around farming, plants, and animals. Further, biosolids treated according to the processes of the invention are safe for handling by and around humans.

Figure 2:
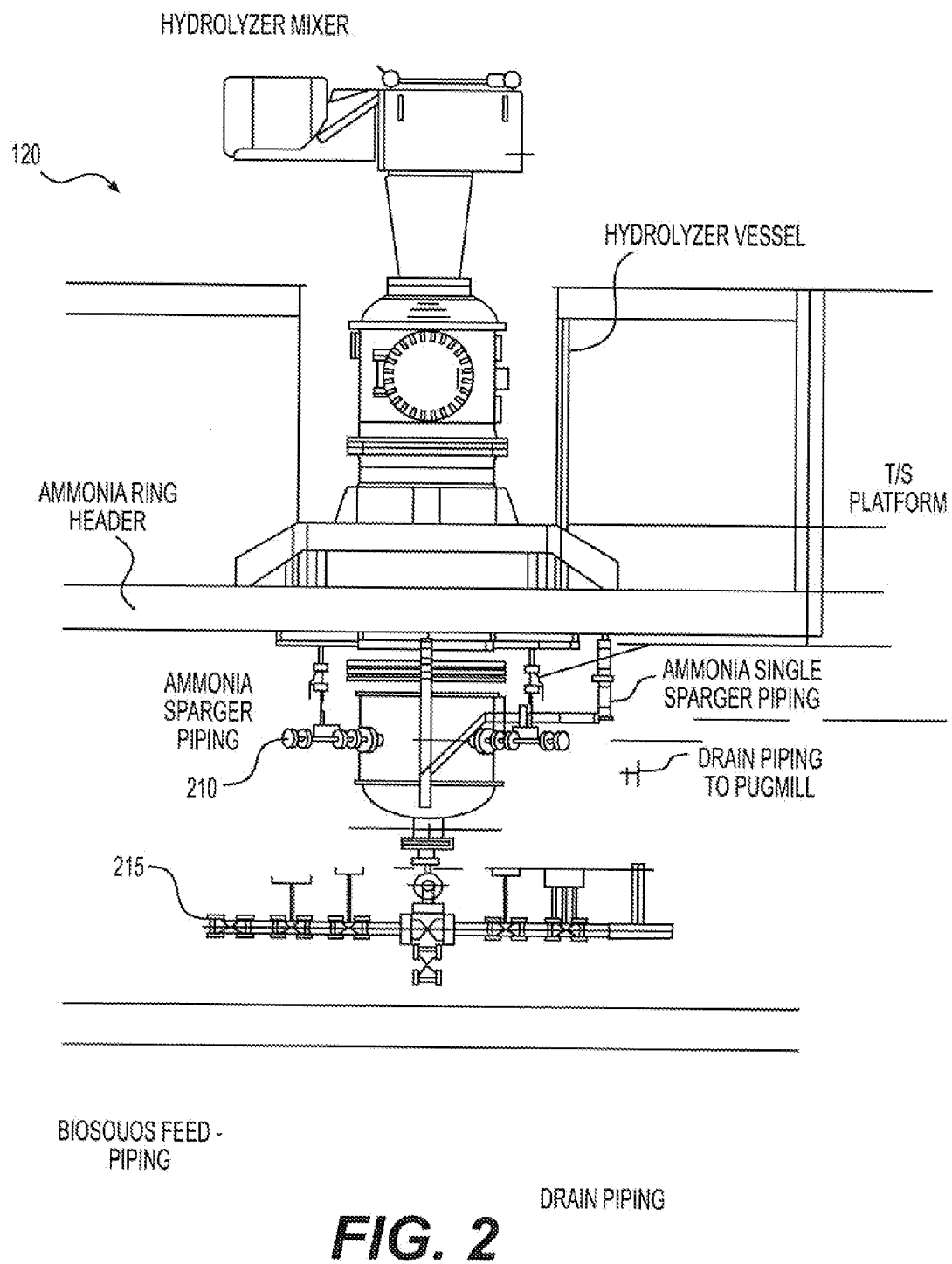
FIG. 2. Pressure Vessel Reaction Hydrolyzer.
Figure 3:
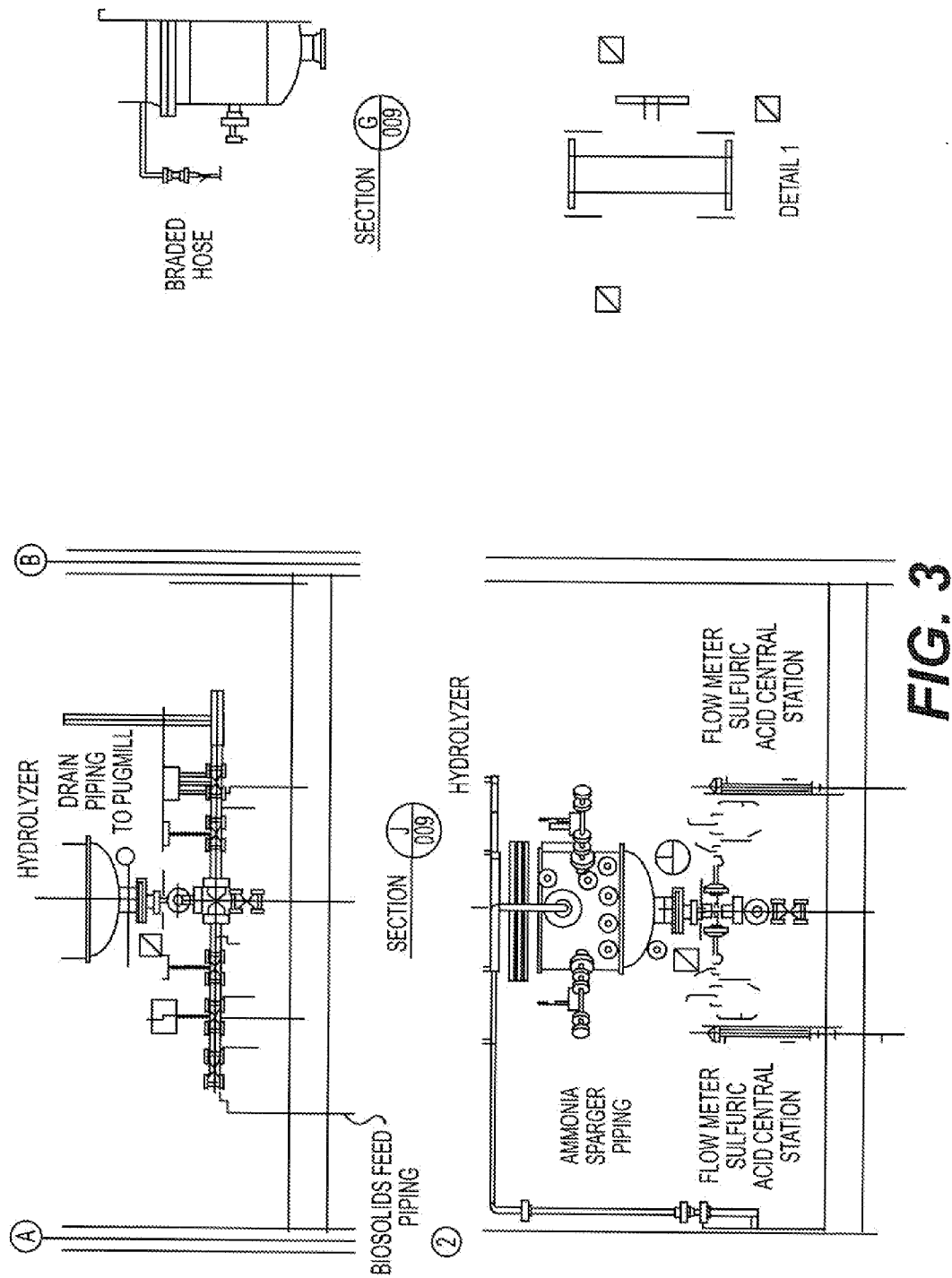
FIG. 3. Detail of Ammonia and Sulfuric Acid Injection into Hydrolyzer.
Figure 4A:
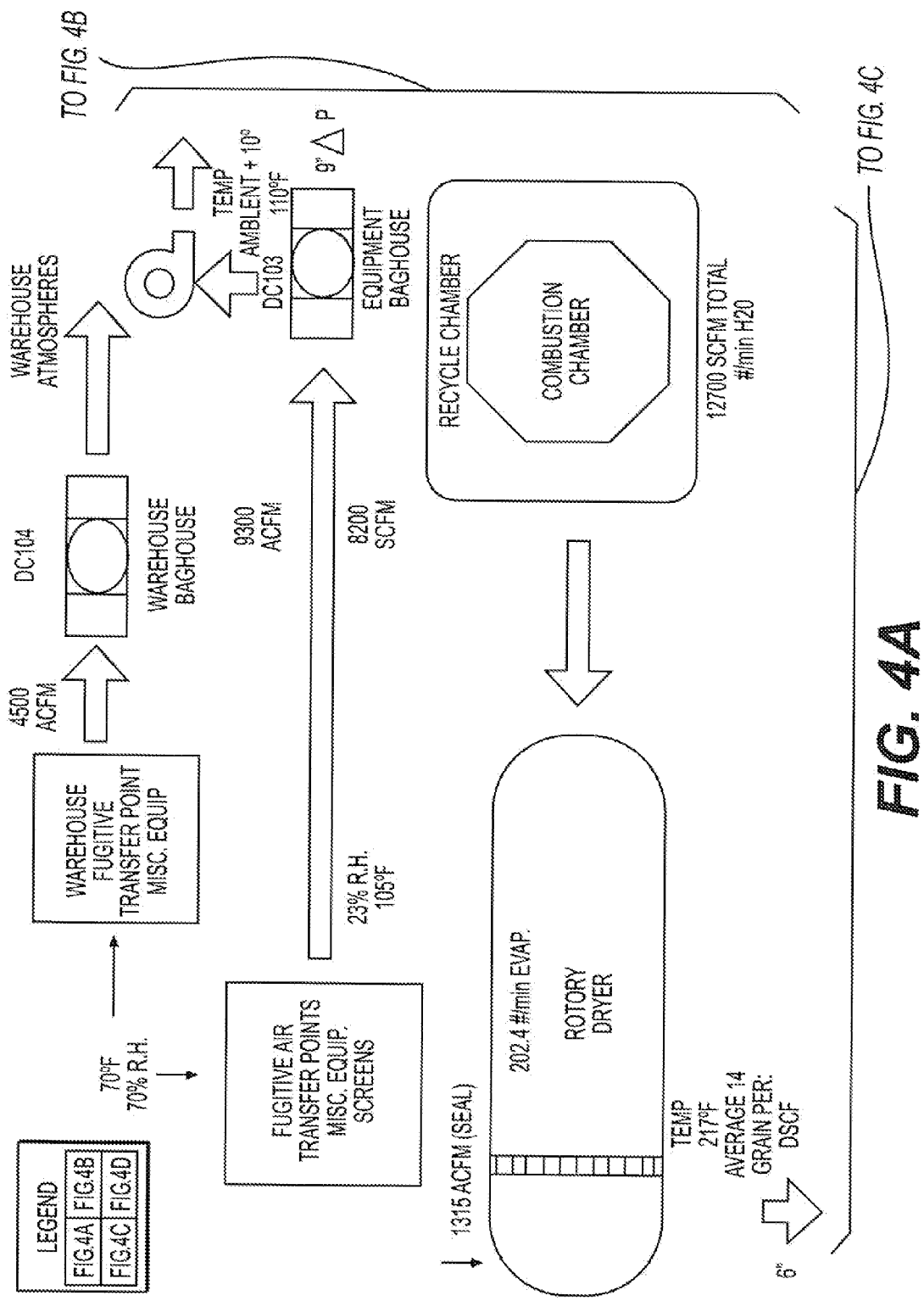
FIG. 4. Biosolid Fertilizer Plant Air Flow Diagram.
Figure 4B:
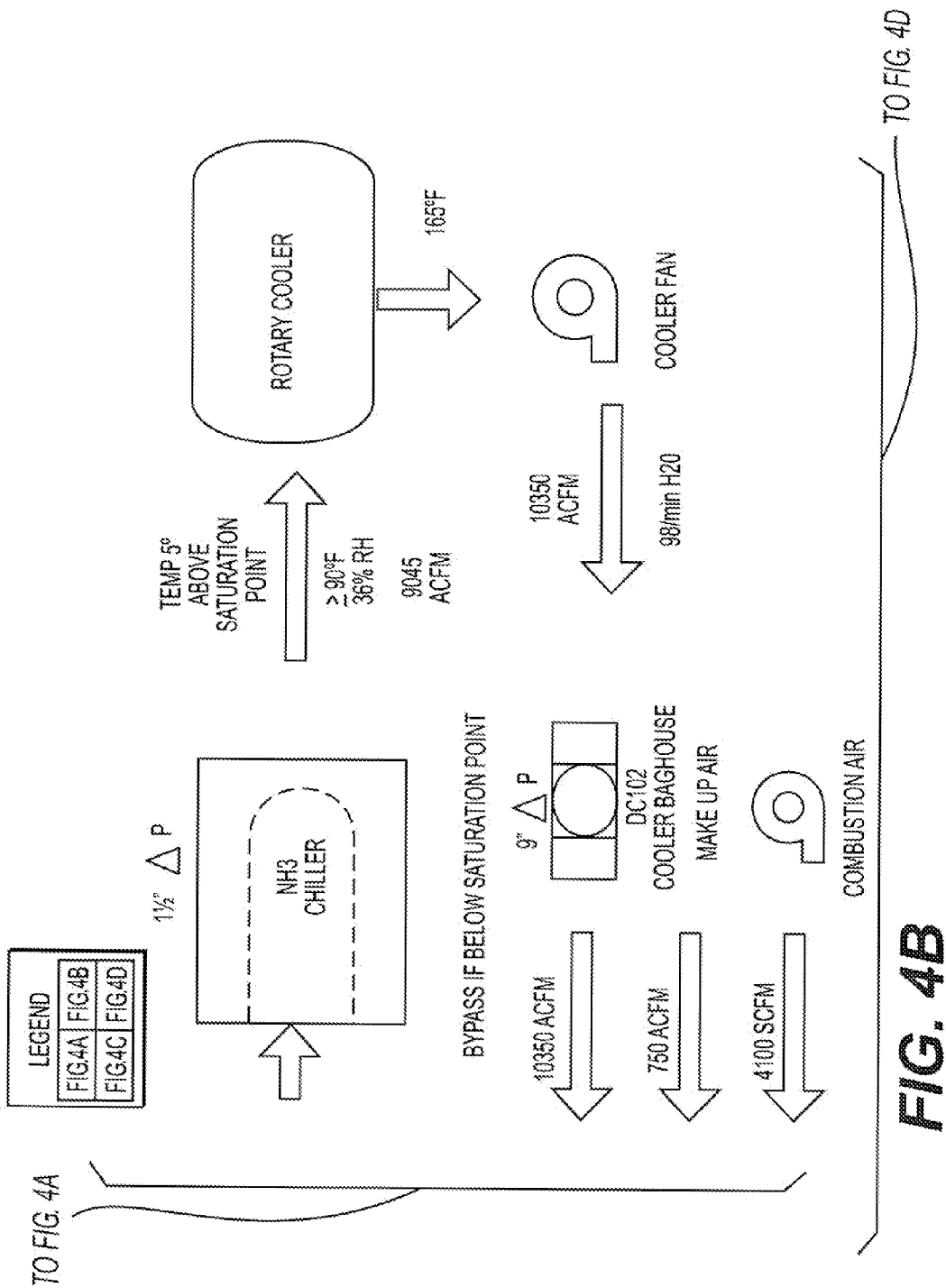
Figure 4C:
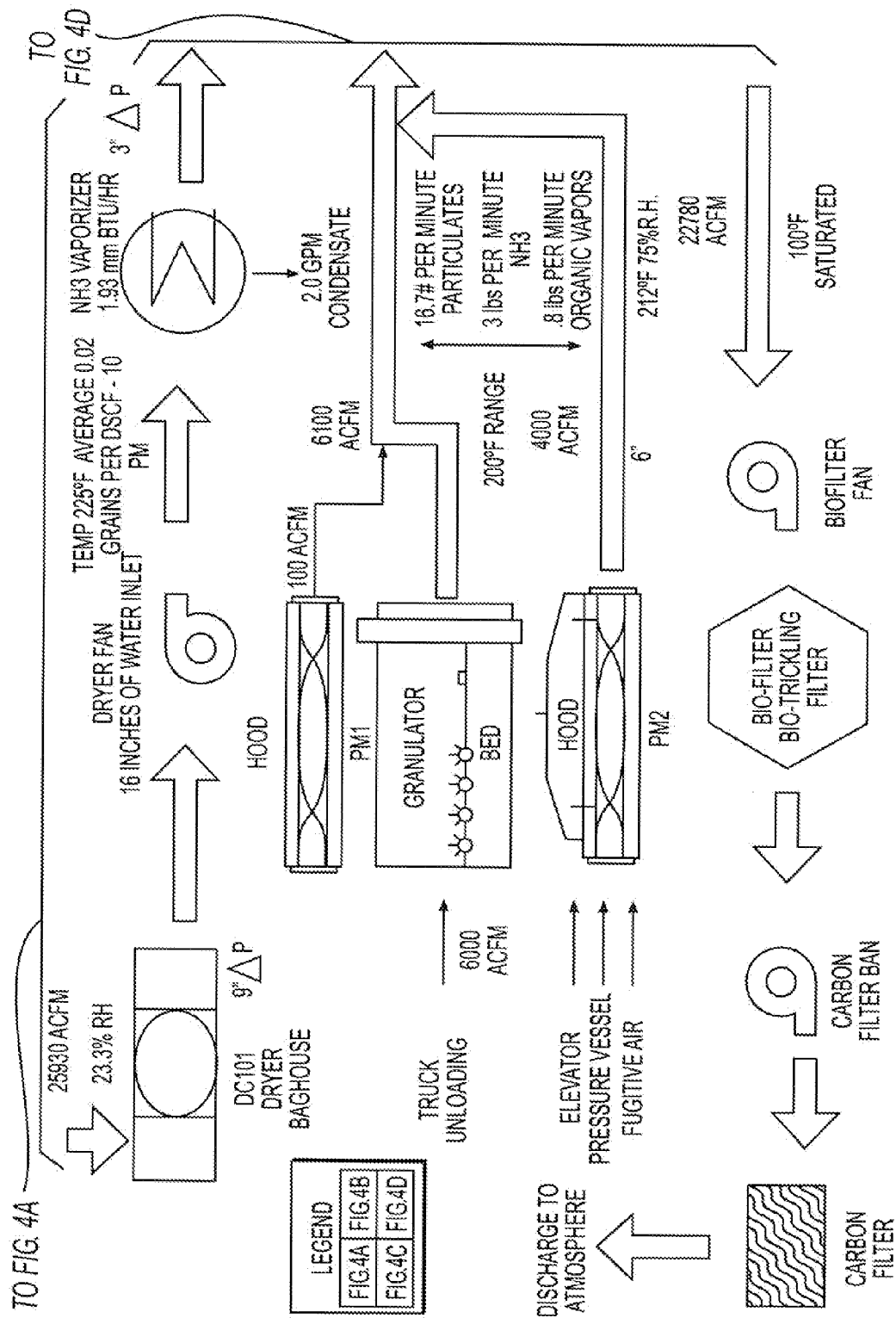
Figure 4D:
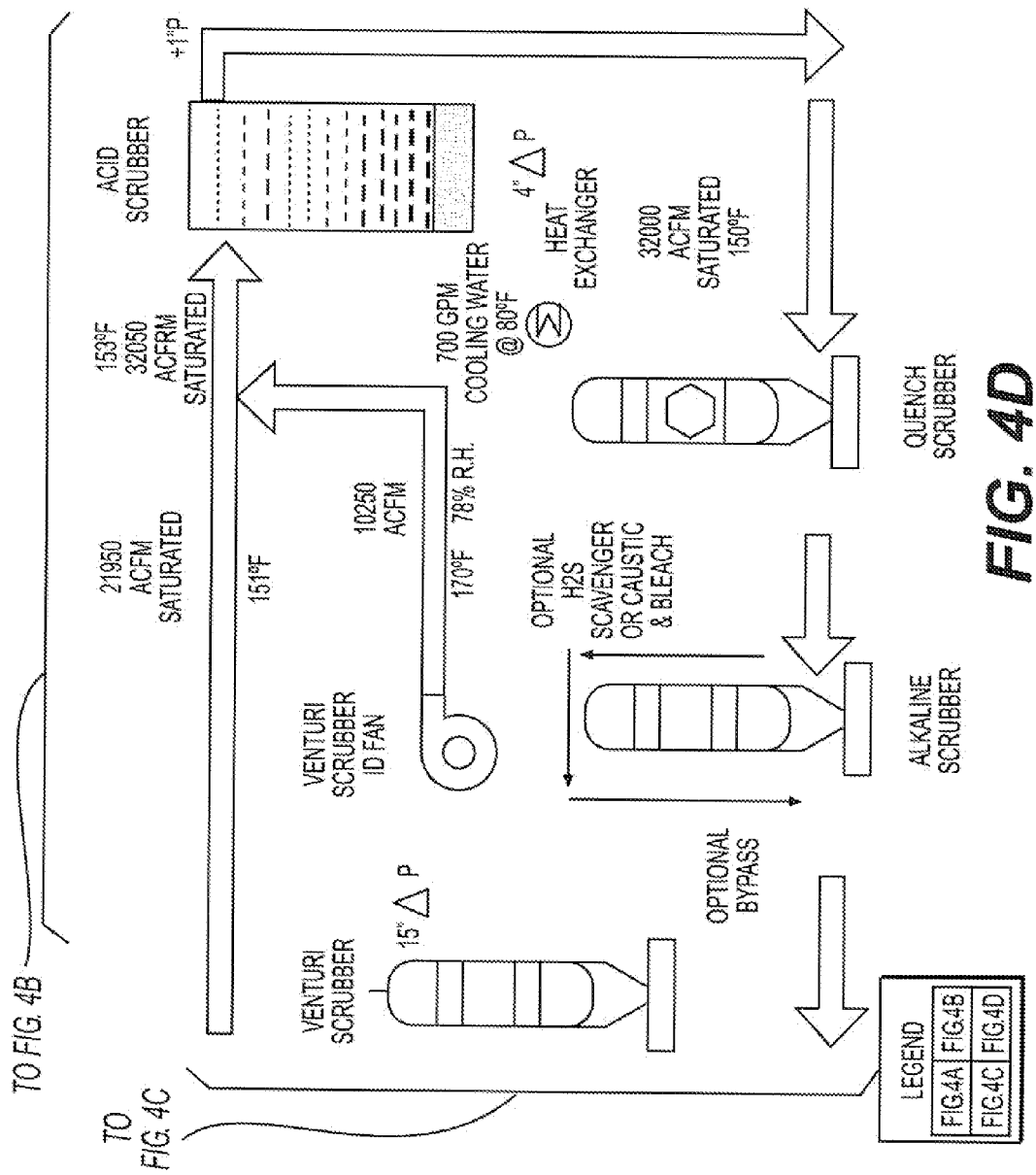

FIG. 1 provides a schematic diagram of an embodiment of the present invention, wherein the process of this embodiment utilizes dewatered municipal biosolids combined with additional plant nutrients, ammonium salt fertilizers, and binding agents. In this embodiment, the biosolids to be treated is a dewatered biosolids, often referred to as a "biosolids cake." This biosolids are delivered to the manufacturing facility where they are stored in a storage bin 105 until the biosolids are ready to be conditioned. The conditioning initially takes place in a first pug-mill 110 by a vigorous mixing or blending with concentrated acid for odor control and acidification, along with oxidizing agents such as ferrate, which converts the thixotropic biosolids into a pumpable mix, paste, or paste-like mix. The oxidizing agent reacts with reduced sulfur compounds and other odorants present in the biosolids. The concentrated acid slightly acidifies the biosolids and, if the acid is phosphoric acid, assists in modifying odorants present in the biosolids. The exothermic reaction of this acidic mixture attains temperatures exceeding 230° F. (110 C), which obviates the need for applied heating. Preferably, steam from a steam generator 115 can be injected at the beginning of the pug-mill 110 to facilitate startup and flow of the biosolids into the plant and also to enhance the exothermic reaction. As the biosolid melt proceeds through the sealed pug-mill 110 additional plant nutrients can be infused into the mix. Once the mix exits the pug-mill 110 it is pumped into a pressure vessel 120 where the primary nitrogen infusion reaction occurs. As shown in FIGS. 2 and 3, a sparger 210 injects ammonia gas or other nitrogen source into the melt along with the infusion of sulfuric acid to induce a highly exothermic reaction in the acidified biosolids that infuse the biosolids paste. This reaction is carefully controlled to optimize temperature, pressure, retention time, pH, and nitrogen, all of which can be empirically determined based on the input biosolid materials and the desired output content of treated and dried biosolids. The pressure vessel 120 includes a plurality of valves 215 that allow the addition of steam from steam generator 115, other additives, and can be used to control the temperature, presser, and pH and nitrogen levels. The nitrogen source 125 that is pumped into the pressure vessel 120 comprises a base, such as anhydrous or aqueous ammonia. A mix of biosolids and ammonium sulfate and ammonium phosphate is formed that becomes molecularly integrated in that the ammonium ions become electrically bound to the amphoteric organic molecules from the bio solids thereby creating a slow-release or controlled release nitrogen in the final fertilizer granule. Similarly, this electric bonding can occur between the sulfate and phosphate and iron molecules present in the mix thereby rendering these nutrient molecules similarly to a slow-release or controlled release state. This mix is maintained in a stress condition for a retention period as determined by its retention time (which in turn is based on the head pressure and volume as described herein) as the mix moves through the pressure vessel 120. The stress condition preferably includes elevated temperature, and/or elevated pressure. The elevated temperature is produced partly or entirely by the exothermic reaction of the components, which can increase the temperature of the mix to 230° F. (110 C) or greater. At these temperatures steam is generated from the mix. This steam is allowed to exit the pressure vessel 120 under valve-controlled release, accomplishing a partial drying of the mix. The stress condition the biosolids undergo in the pressure vessel 120 and the retention period are controlled so as to result in the production of a mix that is sterile and that contains hydrolyzed macromolecules from the biosolids. Control of the stress condition and the retention period also results in the fusion of the ammonium ions formed with the organic molecules present creating a natural slow-release property for the nitrogen present, and the denaturization and or hydrolysis of many macromolecules present in the biosolids, such as proteins. When such molecules are biologically active, this denaturization and/or hydrolysis renders them less active or inactive thereby creating a safer mix for public usage or exposure. The retention time to induce the necessary fertilizer properties and biological inactivation are controlled by the continuous pumping and flow of the biosolids into the pressure vessel 120. This continuous flow processing of the invention versus the traditional batch processing of older plants aids the high throughput of this invention. The continuous flow also minimizes the problems associated with clogging of the process necessitating down time to clear the clog. When the biosolids mix flows from the pressure vessel 120, it exits into a second mixer or pug-mill 130, where the biosolid is mixed with a hardening agent or agents, as well as with additional nutrients to fine tune the fertilizer. If a melt was formed in the pressure vessel 120 from partial ammoniation with excess acid, the mix is also sparged with an additional amount of a nitrogen source comprising a base, such as ammonia, preferably vaporized ammonia in order to complete the ammoniation thereby forming ammonium salt. Preferably, liquid ammonia is added and converted to vaporized ammonia prior to entering the spargers in both the pug-mill 130 that follows the pressure vessel 120 and the granulator 135. This conversion to vaporized ammonia improves operation of the plant as well as reduces energy requirements. The liquid anhydrous ammonia is converted to superheated ammonia vapor by means of a heater in order to complete the ammoniation process started in the pressure vessel 120. The heating may be by a direct heater applied to the ammonia delivery line or may be by a heat exchanger installed to recover excess heat from elsewhere in the process. As shown in FIG. 4, the excess heat may be, for example, in the dryer discharge air stream downstream of the baghouses and prior to the acid scrubbers. The ammonia side of the vaporizer is controlled at 90 to 120 psig, and preferably at 100 psig (ammonia saturated at 64° F. {17.8}). The ammonia vapor is superheated with the temperature controlled at 120-200° F. (48.9-93.3 C) and preferably at 170-180° F. (76.7-82.2 C). Replacing liquid ammonia with vaporized ammonia in the recycle pug-mill 130/granulator 135 ammonia spargers provides several benefits, e.g. completing the ammoniation process started in the pressure vessel; improving reaction efficiency by increasing surface area of ammonia to contact unreacted acid; increasing energy efficiency by using waste heat from the process to increase the temperature of the granulator stream thereby increasing evaporation in the granulator 135 and reducing dryer energy required; reducing dust creation and increases granule size and hardness by providing even distribution of ammonia to the reaction zone in the pug-mill 130/granulator 135 (droplets of liquid ammonia can create dust when small localized areas of high pH are created in the uncured granules, and vapor ammonia eliminates this problem); reducing the required water quench by cooling the dryer discharge gas stream and utilizing the heat; or combinations thereof.

Next, the mix is preferably further treated by granulation or extrusion into granules such as pellets or other, smaller structures. The granules are dried in rotary dryer 140 and passed through one or more screens 145 to separate oversized materials and undersized materials from proper-sized materials. The oversized materials can be crushed in a crusher or mill. Subsequently, the undersized materials and the crushed oversized materials can be recycled to the second mixer or pug-mill 130 to facilitate the granulation of the fertilizer mix. The resulting proper-sized granules are then dried in rotary cooler 150, sized, coated, cooled and stored. When a traditional granulator is used in the shaping process, ammoniation by vaporized ammonia and recycle addition may occur in that vessel as well. Water removed from the mix as steam from the pressure vessel and from subsequent vessels as steam and/or water vapor may be condensed and preferably returned to the wastewater treatment plant (WWTP), or may be treated and discharged into adjacent water resources, or into the atmosphere.

A preferred element of the invention involves treating biosolids by conditioning the biosolids by mixing with a force sufficient to render the biosolids pumpable. The biosolids can be further conditioned by adding one or more oxidizing agents and/or by adding one or more acids to reduce the pH of the biosolids. The conditioning typically occurs in a mixer or a pug-mill, which can optionally be heated. The conditioned biosolids are then added to a pressure vessel. Subsequently or simultaneously once the process reaches steady-state, one or more acids and one or more nitrogen sources are combined within a reaction zone located within the pressure vessel biosolids. The reaction zone is an area of optimal application of any acid, any base, any nitrogen source, and any combination thereof, in order for the biosolids to be treated in embodiments of this invention. The reaction zone is optimized based on the size of the vessel into which the biosolids are placed. The reaction zone size varies depending on the inflow of acid, base, and/or nitrogen source, as well as on the viscosity of the biosolids. The reaction zone is preferably located in the bottom portion of the biosolids in the pressure vessel, preferably as low as possible, so that the weight of the materials in the vessel presses down on it, thereby helping to contain any force generated by the exothermic reaction. The reaction zone is the portion of the biosolids into which acids, bases, and/or nitrogen sources are injected. Use of the term "reaction zone" is not intended to imply that reaction occurs only within the reaction zone. While the initial combination of the reactive components and the initial exothermic reaction occurs in the reaction zone, the exothermic reaction continues to occur throughout the vessel. At least one of the one or more nitrogen sources comprises a base, and so an exothermic reaction can take place between the acid and the base. Subsequently, this mix is maintained in a stress condition for a retention period. The stress condition can result in the partial hydrolysis and/or denaturation of any macromolecules including proteins contained in the biosolids component of the mix. The stress condition can also result in the partial hydrolysis and/or denaturation of any personal pharmaceutical compounds, antibiotics, hormones, hormone-like molecules, or other biologically active compounds. The stress condition and the retention period can create an autoclave effect over extended temperature and pressure exposures that destroys by sterilization any microorganisms present in the biosolids, including bacteria, viruses, fungi, parasites, and parasite eggs. The stress condition can include agitating the mix, an increase in temperature and/or pressure due to any exothermic reaction of the components of the mix. Temperature increases of the mix due to the stress condition preferably exceed 85 C (185° F.), more preferably 100 C (212° F.), more preferably 121 C (250° F.), and more preferably 126 C (260° F.). Any pressure increase of the mix due to the stress condition preferably exceeds 20 pounds per square inch (psi), more preferably exceeds 30 psi, and more preferably exceeds 38 psi and more preferably meets or exceeds 62 psi.

Another embodiment of the invention is directed to methods of manufacturing a fertilizer comprising conditioning via agitation and oxidation and initial acidification of an amount of bioorganic biosolids such as a municipal dewatered biosolids in a pug-mill; mixing concentrated acid with ammonia simultaneously in the presence of the conditioned biosolids to create an ammonium melt (a partially ammoniated mix) in a pressure vessel under controlled temperature, atmospheric pressure, mix retention time and water removal as steam and/or water vapor; and further processing said hydrolyzed mix via an additional mixer, blending in optional additional conditioners, such as an iron oxide, and at least one hardener into the fertilizer mixture to control hardness; and sparging said additional mixer with additional vaporized or gaseous ammonia to complete the salt formation of ammonium sulfate and/or ammonium phosphate and following that via traditional granulation processing to create a granular organically-augmented inorganic fertilizer in the plant. Sparging of vaporized ammonia may also be carried out in the granulator as is practiced in the manufacturing of granular fertilizers. When iron sulfate, i.e., ferrous sulfate, or iron oxide is added to the mix, the iron is also serving as an important nutrient in the finished fertilizer which both enhances the value of the product and its performance fertilizing target crops.

Another embodiment of the invention is directed to methods of manufacturing a fertilizer comprising conditioning via agitation and oxidation an amount of bioorganic biosolids such as a municipal dewatered biosolids; mixing concentrated acid with ammonia simultaneously in the presence of the conditioned biosolids to create an ammonium salt (little unreacted acid remains) in a pressure vessel under controlled temperature, atmospheric pressure, mix retention time and water removal as steam and/or water vapor; and further processing said hydrolyzed mix via an additional mixer, in an additional mixer blending in optional additional conditioners, such as an iron oxide, and at least one hardener into the fertilizer mixture to control hardness ammonium fertilizer art and following that by traditional granulation processing to create a granular organically augmented inorganic fertilizer in the plant.

Another embodiment of the invention is directed to methods of manufacturing a fertilizer comprising mixing a thixotropic organic biosolids to produce a pumpable paste-like mix; treating the mix with one or more oxidants and acidifying the thixotropic paste in a mixer to produce a first conditioned mixture; obtaining a high temperature inorganic fertilizer melt comprised of partially ammoniated mix containing ammonium sulfate and or ammonium phosphate with excess acid; blending the hot melt with the conditioned mixture to produce a second mixture in a pressure vessel with a temperature over 85 C (185° F.) and preferably over 100 C (212° F.) under controlled atmospheric pressure and mix retention time and removing water (as steam and water vapor) from said mix; further processing said second mix in an additional mixer to blend in optional additional conditioners, such as an iron oxide, and at least one hardener into the fertilizer mixture to control hardness and sparging said additional mixer with vaporized ammonia to complete the salt formation of ammonium sulfate and or ammonium phosphate; continuing to remove water from the third mixture to produce a material that can be further processed with traditional granulation processing or extrusion technologies; and creating an end product fertilizer from the third mixture. Sparging of vaporized ammonia may also be carried out in the granulator.

Another embodiment of the invention is directed to methods of manufacturing a fertilizer comprising mixing a thixotropic organic biosolids to produce a pumpable paste-like mix; treating the mix with an oxidant and acidifying the paste in a mixer with phosphoric acid to produce a first mixture; obtaining a high temperature inorganic fertilizer salt comprised of ammonium sulfate and or ammonium phosphate; blending the hot salt with the first mixture to produce a second mixture in a pressure vessel with a temperature over 85 C (185° F.) and preferably over 100 C (212° F.) under controlled atmospheric pressure and mix retention time and removing water (as steam and water vapor) from said mix; blending in optional additional conditioners, such as an iron oxide, and at least one hardener into the fertilizer mixture to control hardness; continuing to remove water from the third mixture to produce a material that can be further processed with traditional granulation processing or extrusion technologies; and creating an end product fertilizer from the third mixture.

Another embodiment of the invention is directed to methods of manufacturing a fertilizer comprising mixing a thixotropic organic biosolids to produce a pumpable paste-like mix; conditioning the mix with one or more oxidants, preferably calcium ferrate, in a first pug-mill or mixer to produce a first alkaline mixture; then discharging this conditioned mix into a second pug-mill or mixer into which an ammonia source is added. In this embodiment, aqueous ammonia is used as the base. This second mixer then discharges its alkaline ammoniated mix into the pressure vessel. The pressure vessel will receive a concentrated sulfuric acid to produce a high temperature inorganic fertilizer melt comprised of ammonium sulfate. In this embodiment phosphoric acid is also added to the pressure vessel, which produces ammonium phosphate. The phosphoric acid is added to the pressure vessel rather than to the first pug-mill as with other embodiments because to add the phosphoric acid early in the first pug-mill would then produce an undesirable exothermic reaction in pug-mill. The exothermic reaction in the pressure vessel achieves a temperature over 100 C (212° F.) and preferably over 137.8 C (280° F.), under controlled atmospheric pressure and mix retention time and removing water (as steam and water vapor) from said mix; discharging the fertilizer mix to an additional pug-mill or mixer therein using vaporized ammonia to complete the formation of ammonium salts and blending in optional additional conditioners, such as an iron oxide, and at least one hardener into the fertilizer mixture to control hardness; continuing to remove water from the third mixture to produce a material that can be further processed with traditional granulation processing or extrusion technologies; and creating an end product fertilizer from the third mixture.

Alternatively, this embodiment of the invention is directed to methods of manufacturing a fertilizer comprising mixing a thixotropic organic biosolids to produce a pumpable paste-like mix; optionally conditioning the mix with one or more oxidants and then acidifying the paste in a first pug-mill or mixer with phosphoric acid to produce a first mixture; then discharging this conditioned mix into a second pug-mill or mixer into which flows concentrated acid or aqueous ammonia, but not both. This second mixer then discharges its mix into the pressure vessel. The pressure vessel then receives either an ammonia source or a concentrated sulfuric acid depending upon whether an acid or a base was added to the second pug-mill, thereby obtaining a high temperature inorganic fertilizer melt comprised of primarily ammonium sulfate with a smaller amount of ammonium phosphate with a temperature over 100 C (212° F.) and preferably over 137.8 C (280° F.), under controlled atmospheric pressure and mix retention time; removing water (as steam and water vapor) from said mix; discharging the fertilizer mix to an additional pug-mill or mixer therein completing the formation of ammonium salts using vaporized ammonia and blending in optional additional conditioners, such as an iron oxide, and at least one hardener into the fertilizer mixture to control hardness; continuing to remove water from the third mixture to produce a material that can be further processed with traditional granulation processing or extrusion technologies; and creating an end product fertilizer from the third mixture.

Another embodiment of the invention is directed to methods of manufacturing a fertilizer in the manner of the above embodiments but with the substitution of heat-dried biosolids or organic biosolids for the dewatered biosolids cake described herein. This dried biosolids material may range in solids from 30 percent to 99.9 percent, but preferably and more commonly range from 90 percent to 99.9 percent in order to be classified as Class A by the USEPA as governed by their Vector Attraction rules for biosolids or biosolids-containing material. The dried biosolids or organic biosolids material, if received as pellets or granules, must be milled to a powder before the addition of some water and subsequently exposed to an oxidation agent and acidification during conditioning. The conditioned biosolids can then be processed through the remainder of the process as described in the above embodiments.

Another embodiment of the invention is directed to methods of manufacturing a fertilizer in the manner of the above embodiments but with the substitution of three pressure vessels in order to operate the processes in a "continuous batch" manner. The addition of chemicals, mixing, reactions, ammoniation, removal of water and granulation or extrusion would occur as described for any of the above embodiments.

An additional embodiment of the present invention accepts dewatered or dried biosolids but does not condition them in the manner described in the above embodiments. Instead, the biosolids are simply agitated to a pumpable state; optionally water may even be added if necessary. These pumpable biosolids are then processed as in the above embodiments. The oxidation agents and optionally, additional phosphoric acid for pH control, nutrient addition and suppression of auto oxidation may be added in the second mixer or pug-mill that follows the pressure vessel or may be eliminated completely. The remaining processing steps are as described herein.

Incoming dewatered biosolids may be of varying percent of solids, preferably ranging from 17 percent to 32 percent solids. The biosolids can range from 33 percent solids to 100 percent solids. When they are of a dry solids nature, they are milled to a powder and then processed further.

Preferably, biosolids are in the range of 12 percent to 40 percent solids with biosolids between 18 percent and 30 percent. This delivery may be either through conveyors or pipes from the wastewater treatment plant ("WWTP") or by traditional transportation using truck, train or barge. Upon arrival at the plant, the dewatered biosolids may be passed through a lump breaker or screening device to remove large foreign objects that might damage or destroy pumps or other equipment in the process. The biosolids placed into a surge or holding tank or silo or a live bottom bin for accumulation and storage until processed. Preferably, the delivered biosolids may be placed in a holding tank or silo and then transferred to the first mixing apparatus for conditioning.

If the biosolids have not been screened for contaminant removal prior to surge storage, then they are next preferably passed through a lump breaking apparatus or screen device to remove any metal or rock or other large foreign objects to protect the pumping and blending apparatuses later used in the process. The solids are then transferred by screw conveyor or pump to the reaction vessel. This material is then conditioned further with an oxidizing agent which may be selected from the group, calcium ferrate, sodium ferrate, potassium ferrate, ozone, hydrogen peroxide, calcium hypochlorite, sodium hypochorite, potassium hypochorite, chlorine dioxide and oxygen itself as well as with mixtures of said oxidants. In the preferred embodiment of the present invention, the selected oxidant is injected into the initial mixing apparatus for the purpose of oxidizing reduced sulfur compounds present in the biosolids as well as other odorants therein contained. Further, the conditioning process conducted within the initial pug-mill also includes the introduction of a concentrated acid, preferably phosphoric acid and more preferably with concentrated phosphoric acid of at least 50 percent strength and preferably a black or agricultural phosphoric acid at 54 percent strength creating an acidic paste within the initial mixer. Optionally, process water and blow-down water from the air scrubbing apparatus can be infused into the initial mixer, or they may be infused into the biosolids immediately prior to the lump breaker if necessary. Preferably the process of the invention minimizes the amount of water added into the manufacturing sequence in order to reduce the energy requirements needed for dewatering.

Mixing with oxidizing agent(s) and concentrated acid, preferably phosphoric acid begins the process of odor control and acidifies the bioorganic material to a level of between pH 2.0 and pH 6.9, preferably between pH 3.0 and pH 5.0. This treatment with phosphoric acid also provides a level of resistance to oxidative heating that occurs upon long term storage of finished organic-containing granules, such as commonly occurs with heat-dried biosolids pellets. Heating and mixing in this initial conditioning apparatus will create a pumpable paste. In one embodiment of the present invention, this paste is preferably heated to control odors and prepare the biosolids for mixing with concentrated acid and ammonia in a pressure vessel. Said conditioning heat is preferably imparted to the biosolids by means of an exothermic chemical reaction. Additional heat can be delivered steam infusion.

The establishment of higher than ambient temperatures in the bioorganic material ensures that the heat energy contained in the ammonium salts is advantageously used to kill or sufficiently inactivate at least all harmful pathogens (e.g. bacterial, viral, fungal and parasitic pathogens) that were contained in the bioorganic material, especially municipal biosolids, especially when aqueous ammonia is used to form the ammonium sulfate or ammonium phosphate as less exothermic energy is released when the aqueous ammonia is applied.

Pug-mills or mixers are horizontal mixing chambers having blade-shaped blending elements mounted on a powerfully driven shaft or shafts that rotate at a variable but controlled speed which divide, mix, back-mix and re-divide the materials to be blended multiple times a second to yield a thorough, uniform blend with reliable consistency. The blenders, pug-mills and or mixers used in the processing sequence may be each independently heated via a heated shaft and or heated hollow screw blade mechanism or heated by means of a jacketed sleeve around the apparatus. Heating can also be optionally applied to the second mixing apparatus, preferably a pug-mill especially when aqueous ammonia is used, wherein hardeners, optional pH adjustment agents as in vaporized or gaseous ammonia sparging and dry recycle are added.

Conditioning guarantees a mix with the proper consistency for injection into the pressure vessel. In the preferred embodiment of the present invention, anhydrous (99 percent ammonia) and if necessary as might be required by permit considerations, aqueous ammonia is blended with concentrated sulfuric acid with or without concentrated phosphoric acid, in a pressure vessel. For the purposes of this invention a custom reactor vessel is fabricated. This is in contrast to the development of the pipe-cross reactors and as described by the IFDC in the Fertilizer Manual by Sephri-nix in the Fertilizer Technical Data Book. Specifically, the vessel in the present invention is designed to have a large reaction chamber and to receive the conditioned biosolids at the base of the vessel and both sulfuric acid and ammonia directly above the biosolids input. The acid and the ammonia react forming ammonium sulfate and ammonium phosphate thereby forming a fertilizer mix containing the interaction of the ammonium sulfate and/or the ammonium phosphate. In a preferred embodiment, a melt will be formed by partially ammoniating the acid in this vessel. This will improve the fluidity of the fertilizer mix. The melt of ammonium sulfate/phosphate is preferably at a temperature greater than 100 C (212° F.) and preferably at a temperature greater than 121 C (250° F.) and more preferably at a temperature of greater than 126 C (260° F.). In the pressure vessel the contact time shall be for a minimum of one minute with the preferred range of 15 minutes or more with a more preferred range of 10 to 20 minutes with a preferred retention time for normal operation being about 15 minutes. The pressure vessel will contain an agitation capability using rotating paddles or blades. Such agitation of the mix within the pressure vessel will help ensure uniformity and controlled reaction of the mix along with moving the mix continuously through the closed system. The agitation will also prevent consolidation of the mix and will facilitate discharge of the mix into the pug-mill.

The orientation of the pressure vessel is vertical with steam being released by controlled valve at the upper end of the vessel thereby permitting the atmospheric pressure within the vessel to be controlled. Further, this pressure, greater than 20 psi, and preferably greater than 30 psi, and more preferably greater than 38 psi, combines with the temperature and pH maintained within the vessel such that chemical alterations of macromolecules occur within the vessel. Chemical alterations due to combined heat and pressure include partial denaturization of protein molecules and the hydrolysis of protein molecules and the hydrolysis of other organic compounds. Such denaturization or hydrolysis of organics results in the creation of a safer final product because of the loss of biological activity often associated with such compounds such as personal pharmaceuticals, antibiotics, hormones and other biologically-active organic compounds that were present in the biosolids.

In addition, the high stresses created in the pressure vessel, e.g., pressure and temperature of the invention sterilizes the bioorganic materials for a safer, less harmful fertilizer. Sterility is measured by lack of detection of viable microorganisms.

Following achievement of said times of exposure the venting of the steam and water vapor emitted from the mix and the pressure vessel can take place thereby partially drying the mix from the energy imparted into the mix from the chemical reaction of acid and ammonia. This steam and moisture is captured and used to enhance the current process.

Drying of the mixture continues in the mixer or pug-mill that follows the pressure vessel and may continue in the shaping apparatus such as the granulator, to be completed in a dryer, as in a rotary drum dryer or fluidized bed dryer. Ammoniation is completed in this mixer or pug-mill that follows the pressure vessel by injection of vaporized ammonia or may be optionally completed by injection of vaporized or gaseous ammonia into the granulator.

In one preferred embodiment, the process air is acid scrubbed to remove any fugitive odorants and especially vaporized or gaseous ammonia. The captured ammonia, as an ammonium salt is mixed back into the reaction vessel or mixer thereby increasing the efficiency of the entire system and maximizing the final nitrogen concentration in the finished fertilizer. Miscellaneous residuals including dust, non-specification or reclaimed product and dried fertilizer that is too small or undersized or oversize material that is crushed in a crushing or mill apparatus or may include other additives, e.g., iron that a customer would prefer can be added to the composition of the finished fertilizer are added to the pug-mill or mixer positioned downstream from the pressure vessel. Prior to the completion of the drying process, a hardener or hardeners which help to agglomerate the mix and contribute to the hardness of the dried pellet or granule are added at the pug-mill. The hardener or hardeners are selected from the group comprised of attapulgite clay, lignon, industrial molasses, and alum among others or mixtures of these hardeners.

Optionally, dependent upon the requirements of the customer, additional plant nutrients, for example, potash or other forms of potassium, e.g., potassium hydroxide, are preferably added at the pug-mill. The solid nutrients that may be added also comprise urea, ammonium nitrate, mono-ammonium phosphate, diammonium phosphate, and or potash. Also added in this second pug-mill is any additional iron required. This iron may be of different valences, but the iron compound, known as ferrous sulfate heptahydrate ($FeSO_4.7H_2O$), is preferable in this process as it affects biosolids odor and enhances granulation. The iron contributes an important and valuable plant nutrient to the fertilizer mix.

Also, additional ammonia may be sparged into the pug-mill and into the granulator to complete the formation of the ammonium salt and to control the pH of the mix and to facilitate the formation of the finished granule. The solids used to adjust the pH may also be principally alkaline agents selected from the group comprised of calcium carbonate, sodium hydroxide, calcium oxide, cement kiln dust, lime kiln dust, Class C fly ash, Class F fly ash, multistage burner ash, alum, alum biosolids from water treatment and wood ash. These are added via screw conveyors at specific rates for each compound. The liquid additions also include pH adjustment materials such as acids, e.g., phosphoric acid or sulfuric acid, or caustic solutions, e.g., sodium hydroxide. These are pumped at respective rates to the injection ring to enter the pug-mill.

In addition, pH control agents in addition to the vaporized ammonia added during sparging, may be added to the mixer in the form of one or more of group of alkaline materials such as calcium oxide, calcium hydroxide, potassium hydroxide, or other metal oxides or metal hydroxides, anhydrous ammonia, cement kiln dust, lime kiln dust, fluidized bed ash, Class C fly ash and Class F fly ash addition to raise the pH of the mix. The fertilizer product of the present invention preferably has a pH of between 5.0 and 7.0, more preferably between pH 5.5 and pH 6.5, and more preferably between pH 5.7 and pH 6.3. The remainder of the processing for shaping as in pellet or granule production includes standard fertilizer granulation technology especially for high volume throughput plants. The pellet or granule product, especially in smaller throughput plants considered to be those of less than 25 tons product production per day, may involve more innovative technologies such as injection or extrusion followed by milling or spherulizing the pellet or granule or involves simple discharge from a granulator or granulating pug-mill. When a granulator or granulating pug-mill is used, it is preferable to feed some recycle, as in dry seed material, i.e., dry fines and fines produced by the crusher or mill or sub-specification or reclaim material of the fertilizer product, into the pug-mill and the granulator to adjust the percent moisture present in the mix so that agglomeration or nucleation can occur resulting in granule formation.

Other preferred embodiments comprise adjustments to the processes disclosed herein to control pH, dryness, nutrients in the product, shape, concentrations etc. to produce a plethora of fertilizers specific for different plants such as roses, rhododendrons, and any other flowers, vegetables, herbs, as well as products such as cat litters. Adjustments can also be made according to the geographic area in which the product is to be applied, to vary, for example, nutrients that may be inherently or otherwise missing in the location. Examples of such variations include the addition of calcium, potassium or phosphorus in different amounts. Slow release fertilizers are the preferred embodiment of this invention.

In another preferred embodiment, the partially dry material is injected directly into a vertical fluidized bed dryer to produce dry granules in a single step.

Normal drying for final drying is conducted using a horizontal fluidized bed dryer, or a rotary drum dryer. The dried pellets or granules which are greater than 90 percent solids and preferably are greater than 95 percent solids and more preferably are greater than 98 percent and even more preferably are greater than 99 percent solids are then sized through one or more screens. The specification size may be varied dependent upon customer requirements, however, the range of suitable product for sale is between 0.5 mm and 3.5 mm with the commercial range for normal sized fertilizer is between 2 mm and 3 mm. The present invention also can manufacture a minimal sized product suitable for use in golf course applications which ranges from 0.5 mm to 1.3 mm. The proper sized material is separated and then coated and then cooled in an apparatus, preferably a rotary drum, to less than 140° F. (60 C), preferably to less than 130° F. (54.4 C) and more preferably to less than 120° F. (48.9 C). Coating the granule or pellet optimally occurs in the same vessel as cooling, usually a rotary drum apparatus using ambient air or cooled air as from an ammonia evaporation cooler. Coating may occur in a coating vessel specifically for that purpose prior to entering the cooling vessel. Coating is with a de-duster or glazing material which minimizes dust generation during transport, storage and application. The finished granule or pellet is then conveyed to storage as finished high nitrogen containing bioorganic-augmented inorganic ammonium fertilizer until shipment from the manufacturing site. Properly coated and dried pellets or granules have a hardness of greater than 5 pounds crush resistance in order to resist dusting and handing during transport, shipment and application. The de-duster coating or glazing material often requires a higher temperature, often 180° F. (82.2 C), to maintain a molten condition for application in the coating apparatus.

The granule storage facility or warehouse, usually incorporating bins or silos to contain the granules, must be dry to prevent agglomeration of the granules leading to degradation and destruction. The finished product is upon manufacture a sterile fertilizer having substantially no detectable amount of viable microorganisms, such as $E.\ coli$ or streptococci, harmful to animals or humans. Substantially no viable microorganisms means that the fertilizer is non-toxic and has no detectable amount or a detectable amount well below a threshold for safe handling and use of microorganisms originating from the biosolids. Although the fertilizer is rendered sterile during manufacturing, contamination can be expected from air-borne microorganisms or by microorganisms deposited by animal or other contamination during storage or use. In any case, because the fertilizer product is dry and predominantly inorganic ammonium salts will not support microorganism multiplication at a rate which would lead to a public health problem.

During normal operations periodic shutdown plant equipment will be necessary for inspection, repair, or replacement. This is done to different degrees depending on specific situations. In one embodiment, shutdowns are automatic as in an automated command sequence provided by the plant control processor; in another embodiment, the shutdowns are carried out manually.

If a limited shutdown of the process is necessary to a single piece of equipment the flow of biosolids into the reactor vessel would stop and the unit would empty as much of the contained mix material as possible into the pug-mill. In this situation process water is blocked from entering the pressure vessel which continues to run and empty through its normal discharge. After the fertilizer mix drops to below the normal discharge point, a diverter valve on the discharge closes sealing off the pressure vessel normal discharge. The diverter valve at the bottom of the pressure vessel then shifts, allowing the compressed air entering the head space of the pressure vessel to force remaining material into the return fertilizer mix line. If further cleaning is needed, process water is then injected into the pressure vessel followed by compressed air to purge the water. Cleanout of the pug-mill that follows the pressure vessel, the granulator, the dryer and all subsequent equipment is performed by running them until the vessels are empty.

The fertilizer of the present invention is preferably chemically adjusted to fit the needs of high nitrogen fertilizer requirements containing significant amounts of phosphate, sulfur and iron to enhance the targeted nitrogen (N) content of between 8 wt. percent and 18 percent by weight, and preferably 16 wt. percent permitting significant commercial valuation.

In a modification of the preferred embodiment, two other oxidative materials may be added to the pressure vessel. Liquid hydrogen peroxide at 25 to 50 percent concentration is added by control of a pump to between 1 percent and 5 percent of the biosolids delivery rate into the pressure vessel. Also, calcium hypochlorite, a solid, may be delivered by screw conveyor to a pulverizing mill and then to an additive port at a rate equal to between 1 percent and 5 percent of the volume of biosolids entering the pressure vessel. An additional odor control agent, iron oxide, $Fe_3O_4$, also known as magnetite, a solid, is preferably added using a screw conveyor at a rate to a mill to pulverize and powder these additives prior to addition to the pug-mill. Use of the mill assists in optimizing these solids materials for contact with the odorant molecules present in the biosolids. The iron added here not only serves as an additional odor control agent, but also as a plant nutrient enhancing the usefulness and value of the finished fertilizer product.

In another embodiment of the present invention, the process is basically as described for previous embodiments except that a complete ammonium salt with no excess acid remaining is formed in the pressure or hydrolysis vessel. This then removes the necessity for ammonia sparging in the mixer or pug-mill and or the granulator.

Ammonia sparging using vaporized ammonia may be carried out in the mixer or pug-mill and or in the granulator to complete the ammoniation, pH control and creation of the ammonia salt fertilizer.

Another embodiment of the present invention is practiced as any of the above embodiments except that instead of a dewatered organic biosolids, a drier biosolids, pellets, dry organic pellets or biosolids are received to be processed. Water may or may not be added to starting materials, which may have between 12-40 percent solids, or preferably 18-30 percent solids. The preferred dryness of this embodiment is greater than 90 wt. percent solids, usually received as a heat dried biosolids pellet manufactured at a municipal wastewater treatment plant. This dried pellet or granule usually contains less than 6 wt. percent nitrogen and more commonly, less than 4 wt. percent nitrogen, and therefore is not desirable in the commercial fertilizer distribution system. This embodiment teaches the conversion of such dried low nitrogen pellets or granules into a high nitrogen organically-augmented inorganic ammonium fertilizer. The received dry pellets or granules are milled to a powder to facilitate production of a pumpable paste-like material using a combination of an oxidation agent, an acid and if necessary, the addition of steam or water, or condensed water from later steps in the process.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. The term comprising, where ever used, is intended to include the terms consisting and consisting essentially of. It is intended that the specification and examples be considered exemplary only with the true scope and spirit of the invention indicated by the following claims.

The invention claimed is:

1. A method for a continuous treatment of biosolids comprising:
   dewatering the biosolids to form a pump-able fluid;
   injecting steam into the dewatered biosolids in a first pug-mill;
   mixing concentrated oxidizing agents and one or more first acids into the dewatered biosolids in the first pug-mill;
   feeding the mixed biosolids into a pressure vessel;
   injecting one or more second acids and ammonia into the pressure vessel to combine with the mixed biosolids and form conditioned biosolids;
   feeding the conditioned biosolids into a second pug-mill;
   treating the conditioned biosolids with one or more hardening agents in the second pug-mill; and
   drying the hardened biosolids to form a fertilizer.

2. The method of claim 1, wherein the biosolids comprise one or more of municipal biosolids, heat-dried biosolids, pharmaceutical fermentation wastes, microbial digests of organic products, food stuffs, food byproducts, animal manures, digested animal manures, organic biosolids, biosolids containing microorganisms, or combinations thereof.

3. The method of claim 1, the dewatered biosolids are created by subjecting biosolids to filtration, centrifugation, pressure, or a combination thereof.

4. The method of claim 1, wherein the one or more first acids comprises at least phosphoric acid at a concentration of 50% or more.

5. The method of claim 1, wherein the one or more second acids comprise phosphoric acid, sulfuric acid, or both, and the ammonia comprises anhydrous or aqueous ammonia.

6. The method of claim 1, wherein the one or more second acids and the ammonia together create an exothermic reaction within the mixture.

7. The method of claim 6, wherein the exothermic reaction takes place without external heating.

8. The method of claim 1, wherein the pressure vessel is maintained at a temperature of 230° F. or greater.

9. The method of claim 1, further comprising adding one or more ferrates to the mixture.

10. The method of claim 9, wherein the one or more ferrates is selected from the group consisting of a calcium ferrate, a sodium ferrate, a potassium ferrate, ferrous sulfate heptahydrate, and combinations thereof.

11. The method of claim 9, wherein the one or more ferrates is formed from reaction of a solid-state sodium hydroxide with sodium hypochlorite and ferric chloride.

12. The method of claim 1, wherein the one or more oxidizing agents is selected from the group consisting of hydrogen peroxide, calcium hypochlorite, sodium hypochlorite, potassium hypochlorite, chlorine dioxide, ozone, oxygen, and combinations thereof.

13. The method of claim 1, wherein the biosolids are retained in the pressure vessel for 15 minutes or less.

14. The method of claim 1, wherein one or more of acidity, pressure, flow speed, pH, base infusion speed are controlled by closed-loop computer controls to maintain a predetermined reaction temperature.

15. The method of claim 1, wherein biosolids are continuously processed through the pressure vessel.

16. The method of claim 1, wherein organic material in the treated and dried biosolids is partially or completely hydrolyzed, denatured, or sterilized.

17. The method of claim 16, wherein the organic material is selected from the group consisting of one or more members selected from the group consisting of pharmaceutical compounds, antibiotics, hormones, hormone-like molecules, biologically active compounds, macromolecules, carbohydrates, nucleic acids, fats, lipids, proteins, and combinations thereof.

18. The method of claim 1, wherein phosphate content of the dried biosolids is from 0.5% to 4%.

19. The method of claim 1, wherein nitrogen content of the dried biosolids is enhanced by aqueous ammonia that is added to the pressure vessel.

20. The method of claim 1, further comprising adding a granulating agent to the mixture before drying to form a dried and granulated mixture.

21. The method of claim 20, further comprising crushing the dried and granulated mixture.

22. The method of claim 20, further comprising passing the dried and granulated mixture through one or more screens to isolate granules of a predetermined size.

23. The method of claim 20, further comprising coating the dried granules with a coating agent.

24. The method of claim 23, wherein the coating agent is applied to the granules within a cooling apparatus.

25. The method of claim 20, further comprising cooling the dried and granulated mixture in a cooling apparatus to a temperature of 140° F. or less.

26. The method of claim 25, wherein the cooling apparatus is a fluidized bed, an ammonia chiller, or a rotating drum.

27. The method of claim 1, further comprising passing the conditioned biosolids through a second pressure vessel.

28. The method of claim 1, further comprising adding one or more plant nutrients to the biosolids in the first pug-mill.

29. The method of claim 28, wherein the one or more plant nutrients are selected from the group consisting of urea, ammonium nitrate, ammonium sulfate, monoammonium phosphate, diammonium phosphate, urea ammonium nitrate, liquid urea, potash, iron oxide, soluble iron, chelated iron and combinations thereof.

30. The method of claim 1, wherein the one or more hardening agents are selected from the group consisting of ferric oxides, alum attapulgite clay, industrial molasses, lignon, ligno sulfonate, urea formaldehyde polymerizer and combinations thereof.

31. A method for treatment of biosolids comprising:
combining dewatered biosolids with steam and a first acid to form a mixture;
injecting the mixture, one or more second acids, and ammonia into a pressure vessel to create an exothermic reaction;
subjecting the mixture to a predetermined temperature and pressure for a retention time;
removing the mixture from the pressure vessel after the retention time; and
drying the mixture.

\* \* \* \* \*

UNITED STATES PATENT AND TRADEMARK OFFICE
CERTIFICATE OF CORRECTION

PATENT NO. : 8,557,013 B2  
APPLICATION NO. : 12/981933  
DATED : October 15, 2013  
INVENTOR(S) : Jeffrey C. Burnham, James P. Carr and Gary L. Dahms Page 1 of 1

It is certified that error appears in the above-identified patent and that said Letters Patent is hereby corrected as shown below:

On the Title page, Item (73), please delete "VitAG Holdings, LLC" and insert therefore
--VitAG Corporation--

Signed and Sealed this
Tenth Day of December, 2013

Margaret A. Focarino
*Commissioner for Patents of the United States Patent and Trademark Office*

UNITED STATES PATENT AND TRADEMARK OFFICE
CERTIFICATE OF CORRECTION

| | |
|---|---|
| PATENT NO. | : 8,557,013 B2 |
| APPLICATION NO. | : 12/981933 |
| DATED | : October 15, 2013 |
| INVENTOR(S) | : Jeffrey C. Burnham et al. |

It is certified that error appears in the above-identified patent and that said Letters Patent is hereby corrected as shown below:

This certificate supersedes Certificate of Correction issued December 10, 2013. The certificate is vacated since petition to correct assignee under 3.81(b) was not granted by the office of petitions at time of issuance. The Certificate of Correction was published in error and should not have been issued for this patent. The assignee is reinstated on the title page of patent at Item (73) as
--VitAG Holdings, LLC, Beech Island, SC (US)--.

Signed and Sealed this
Eighth Day of April, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,557,013 B2 | Page 1 of 1 |
| APPLICATION NO. | : 12/981933 | |
| DATED | : October 15, 2013 | |
| INVENTOR(S) | : Jeffrey C. Burnham, James P. Carr and Gary L. Dahms | |

It is certified that error appears in the above-identified patent and that said Letters Patent is hereby corrected as shown below:

On the title page, item (73), please delete "VitAG Holdings, LLC" and insert therefore --VitAG Corporation--

Signed and Sealed this
Sixth Day of May, 2014

Michelle K. Lee
*Deputy Director of the United States Patent and Trademark Office*